(12) United States Patent
Park et al.

(10) Patent No.: US 11,637,730 B2
(45) Date of Patent: Apr. 25, 2023

(54) CONTROLLING A REFERENCE SIGNAL PATTERN BASED ON DOPPLER PARAMETERS

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Jing Sun, San Diego, CA (US); Xiaoxia Zhang, San Diego, CA (US); Zhifei Fan, San Diego, CA (US); Arumugam Chendamarai Kannan, San Diego, CA (US); Akula Reddy, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/151,046

(22) Filed: Jan. 15, 2021

(65) Prior Publication Data

US 2021/0226833 A1 Jul. 22, 2021

Related U.S. Application Data

(60) Provisional application No. 62/962,836, filed on Jan. 17, 2020.

(51) Int. Cl.
*H04L 27/26* (2006.01)
*H04L 5/00* (2006.01)
(Continued)

(52) U.S. Cl.
CPC ........... *H04L 27/2613* (2013.01); *H04B 7/01* (2013.01); *H04L 5/0048* (2013.01);
(Continued)

(58) Field of Classification Search
CPC . H04L 27/2613; H04L 5/0048; H04L 5/0055; H04L 5/0096; H04L 5/0051;
(Continued)

(56) References Cited

U.S. PATENT DOCUMENTS

2021/0105110 A1* 4/2021 Kim ..................... H04L 5/0051

FOREIGN PATENT DOCUMENTS

| CA | 3067322 A1 | 12/2018 |
| EP | 3641182 A1 | 4/2020 |
| WO | 2018230701 A1 | 12/2018 |

OTHER PUBLICATIONS

International Search Report and Written Opinion—PCT/US2021/013769—ISA/EPO—dated Apr. 8, 2021.
(Continued)

*Primary Examiner* — Dady Chery
(74) *Attorney, Agent, or Firm* — Loza & Loza, LL.P/Qualcomm Incorporated

(57) ABSTRACT

Aspects of the disclosure relate to wireless communication networks having a capability of controlling the mapping of reference signals onto a carrier based on one or more Doppler parameters. A demodulation reference signal (DMRS) is mapped to a carrier according to a pattern based on one or more Doppler parameters, such as a Doppler frequency and/or a rate of change of channel conditions. In a further example, if an initial transmission of an information packet fails due to a high Doppler scenario, the probability of success of the retransmission may be improved by altering the DMRS configuration to account for the high Doppler scenario. Other aspects, examples, and features are also claimed and described.

30 Claims, 19 Drawing Sheets

(51) Int. Cl.
    *H04B 7/01*     (2006.01)
    *H04W 80/02*     (2009.01)
    *H04W 72/04*     (2023.01)
    *H04W 72/0446*     (2023.01)
    *H04W 72/0453*     (2023.01)
    *H04W 76/27*     (2018.01)

(52) U.S. Cl.
    CPC ......... *H04L 5/0055* (2013.01); *H04W 72/042* (2013.01); *H04W 72/0446* (2013.01); *H04W 72/0453* (2013.01); *H04W 76/27* (2018.02); *H04W 80/02* (2013.01)

(58) Field of Classification Search
    CPC ...... H04B 7/01; H04B 7/0404; H04B 7/0413; H04W 72/042; H04W 72/0446; H04W 72/0453; H04W 76/27; H04W 80/02
    See application file for complete search history.

(56) References Cited

OTHER PUBLICATIONS

Qualcomm Incorporated: "Discussion on DL DMRS Design", 3GPP TSG RAN WG1 NR Ad-Hoc#2, 3GPP Draft, R1-1711170, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, 12 Pages, Jun. 26, 2017 (Jun. 26, 2017), XP051300370, Retrieved from the Internet: URL: http://www.3gpp.org/ftp/Meetings_3GPP_SYNC/RAN1/Docs/ [retrieved on Jun. 26, 2017] paragraph [0003].

\* cited by examiner

US 11,637,730 B2

CONTROLLING A REFERENCE SIGNAL PATTERN BASED ON DOPPLER PARAMETERS

PRIORITY CLAIM

This application claims priority to and the benefit of provisional patent application No. 62/962,836 filed in the United States Patent & Trademark Office on Jan. 17, 2020, the entire content of which is incorporated herein by reference as if fully set forth below in its entirety and for all applicable purposes.

TECHNICAL FIELD

The technology discussed below relates generally to wireless communication systems, and more particularly, to mapping reference signals onto a wireless carrier.

INTRODUCTION

In a modern wireless communication system, a receiving device may more reliably demodulate a received transmission, if the receiving device first determines the effective channel through which the received transmission traveled. In many such systems, the determination of the effective channel can be based on one or more reference signals having known characteristics. According to the $3^{rd}$ Generation Partnership Project (3GPP) specifications for $5^{th}$ Generation (5G) New Radio (NR), a demodulation reference signal (DMRS) serves this purpose, and may be included in both uplink and downlink transmissions. A receiving device such as a user equipment (UE) utilizes the DMRS to characterize the channel and perform coherent demodulation of a received information-bearing channel. The DMRS pattern for transmitting DMRSs may be configured, e.g., based on one or more conditions related to communication between a transmitting device and the receiving device.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a base station is disclosed. The method includes transmitting first control information indicating an initial DMRS pattern, communicating with a user equipment (UE) utilizing a carrier configured according to the initial DMRS pattern, transmitting second control information indicating a subsequent DMRS pattern that is based on one or more Doppler parameters corresponding to the carrier, the subsequent DMRS pattern being different than the initial DMRS pattern, and communicating with the UE utilizing the carrier configured according to the subsequent DMRS pattern.

In another example, a base station for wireless communication is disclosed. The base station includes at least one processor, a transceiver communicatively coupled to the at least one processor, and a memory communicatively coupled to the at least one processor. The at least one processor may be configured to transmit first control information indicating an initial DMRS pattern, communicate with a UE utilizing a carrier configured according to the initial DMRS pattern, transmit second control information indicating a subsequent DMRS pattern that is based on one or more Doppler parameters corresponding to the carrier, the subsequent DMRS pattern being different than the initial DMRS pattern, and communicate with the UE utilizing the carrier configured according to the subsequent DMRS pattern.

In another example, a non-transitory computer-readable storage medium having instructions for a base station thereon may be disclosed. The instructions, when executed by a processing circuit, cause the processing circuit to transmit first control information indicating an initial DMRS pattern, communicate with a UE utilizing a carrier configured according to the initial DMRS pattern, transmit second control information indicating a subsequent DMRS pattern that is based on one or more Doppler parameters corresponding to the carrier, the subsequent DMRS pattern being different than the initial DMRS pattern, and communicate with the UE utilizing the carrier configured according to the subsequent DMRS pattern.

In a further example, a base station for wireless communication may be disclosed. The base station includes means for transmitting first control information indicating an initial DMRS pattern, means for communicating with a UE utilizing a carrier configured according to the initial DMRS pattern, means for transmitting second control information indicating a subsequent DMRS pattern that is based on one or more Doppler parameters corresponding to the carrier, the subsequent DMRS pattern being different than the initial DMRS pattern, and means for communicating with the UE utilizing the carrier configured according to the subsequent DMRS pattern.

In one example, a method of wireless communication by a UE is disclosed. The method includes receiving first control information indicating an initial DMRS pattern, communicating with a base station utilizing a carrier configured according to the initial DMRS pattern, receiving second control information indicating a subsequent DMRS pattern that is based on one or more Doppler parameters corresponding to the carrier, the subsequent DMRS pattern being different than the initial DMRS pattern, and communicating with the base station utilizing the carrier configured according to the subsequent DMRS pattern.

In another example, a UE for wireless communication is disclosed. The UE includes at least one processor, a transceiver communicatively coupled to the at least one processor, and a memory communicatively coupled to the at least one processor. The at least one processor may be configured to receive first control information indicating an initial DMRS pattern, communicate with a base station utilizing a carrier configured according to the initial DMRS pattern, receive second control information indicating a subsequent DMRS pattern that is based on one or more Doppler parameters corresponding to the carrier, the subsequent DMRS pattern being different than the initial DMRS pattern, and communicate with the base station utilizing the carrier configured according to the subsequent DMRS pattern.

In another example, a non-transitory computer-readable storage medium having instructions for UE thereon may be disclosed. The instructions, when executed by a processing circuit, cause the processing circuit to receive first control information indicating an initial DMRS pattern, communicate with a base station utilizing a carrier configured according to the initial DMRS pattern, receive second control information indicating a subsequent DMRS pattern that is based on one or more Doppler parameters corresponding to the carrier, the subsequent DMRS pattern being different than the initial DMRS pattern, and communicate with the base station utilizing the carrier configured according to the subsequent DMRS pattern.

In a further example, a UE for wireless communication may be disclosed. The UE includes means for receiving first control information indicating an initial DMRS pattern, means for communicating with a base station utilizing a carrier configured according to the initial DMRS pattern, means for receiving second control information indicating a subsequent DMRS pattern that is based on one or more Doppler parameters corresponding to the carrier, the subsequent DMRS pattern being different than the initial DMRS pattern, and means for communicating with the base station utilizing the carrier configured according to the subsequent DMRS pattern.

These and other aspects of the invention will become more fully understood upon a review of the detailed description, which follows. Other aspects, features, and examples will become apparent to those of ordinary skill in the art, upon reviewing the following description of specific, examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while examples may be discussed below as device, system, or method examples it should be understood that such examples can be implemented in various devices, systems, and methods.

DETAILED DESCRIPTION

Figure 1:
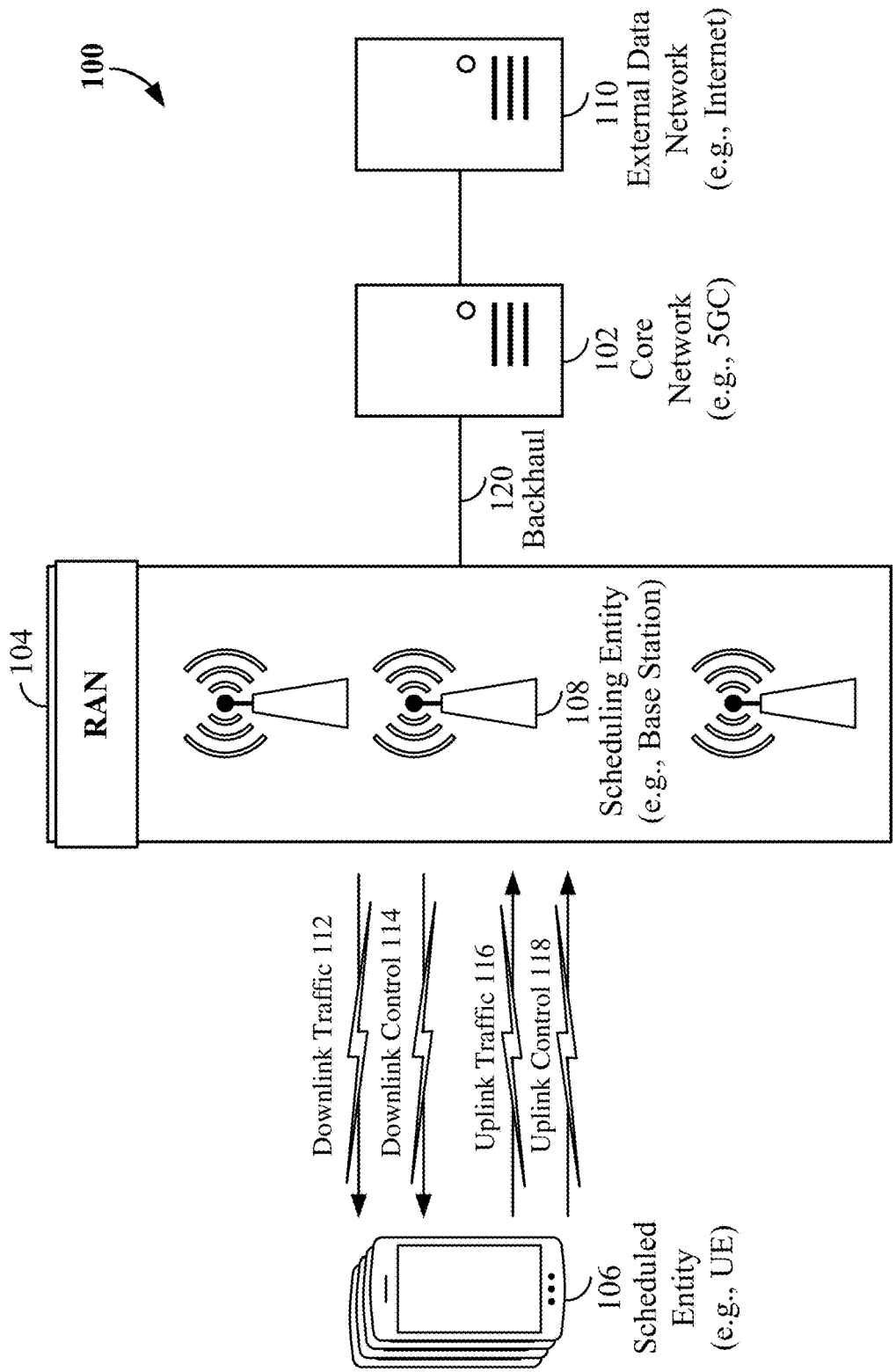
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure relate to wireless communication networks having a capability of controlling the mapping of reference signals onto a carrier based on one or more Doppler parameters. A demodulation reference signal (DMRS) is mapped to a carrier according to a pattern based on one or more Doppler parameters, such as a Doppler frequency and/or a rate of change of channel conditions. The DMRS pattern may vary from slot-to-slot, or may be applied across a plurality of slots in slot aggregation. In a further example, if an initial transmission of an information packet fails due to a high Doppler scenario, the probability of success of the retransmission may be improved by altering the DMRS configuration to account for the high Doppler scenario.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
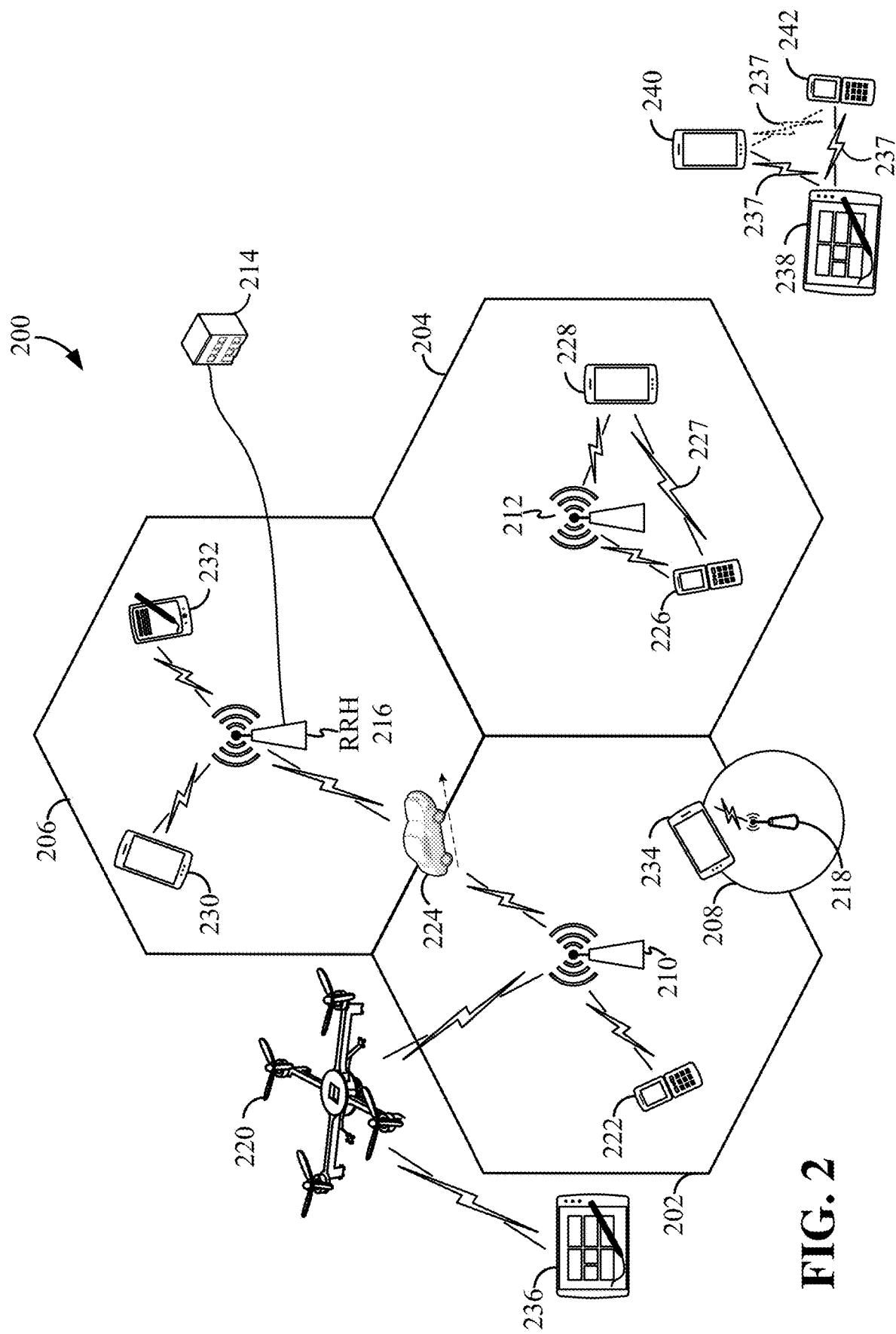
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that information through the base station 212. In this example, the base station 212 may allocate resources to the UEs 226 and 228 for the sidelink communication. In either example, such sidelink signaling 227 and 237 may be implemented in a device-to-device (D2D) network, P2P network, vehicle-to-vehicle (V2V) network, a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
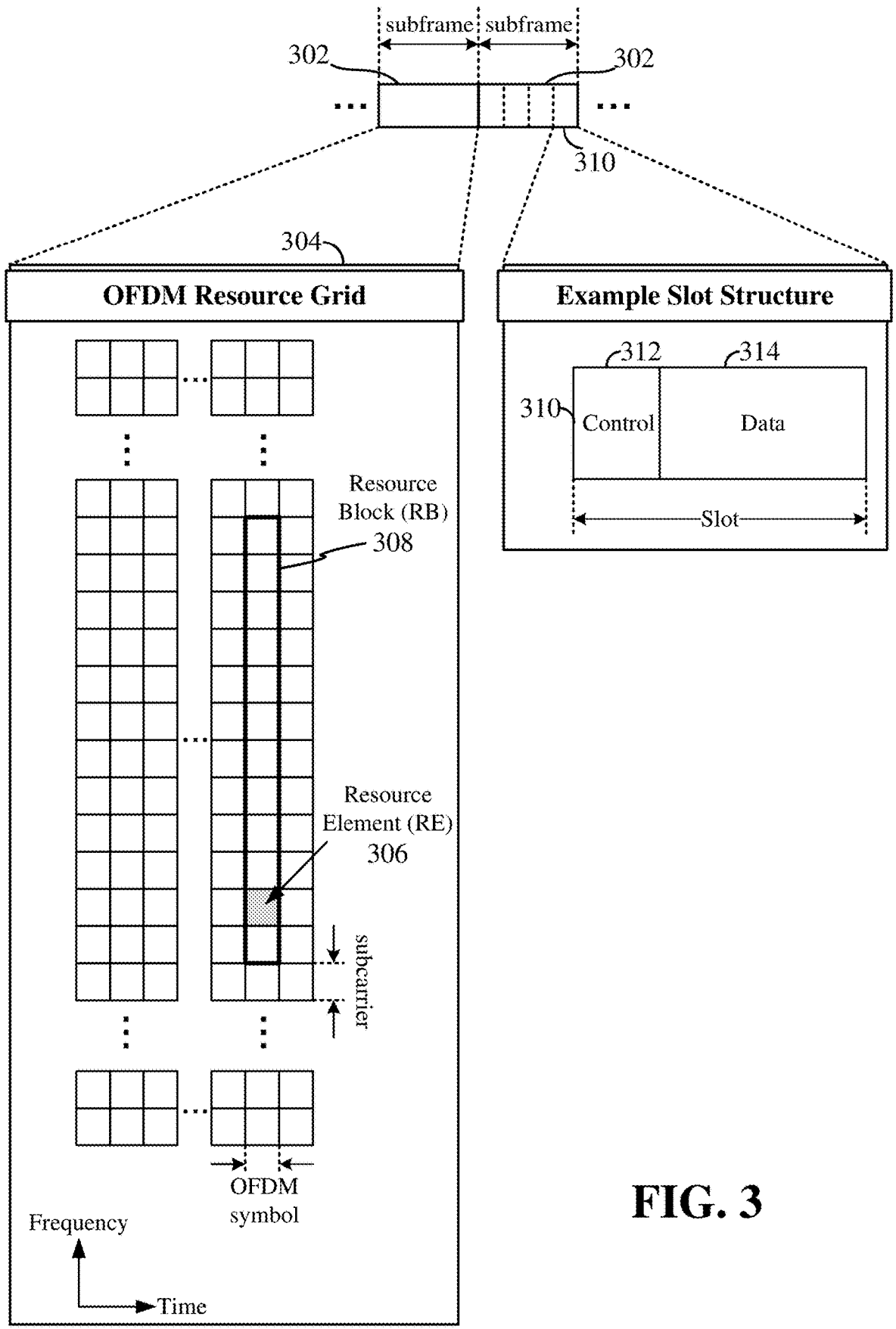
FIG. 3 is a schematic illustration of an organization of wireless resources in an air interface utilizing orthogonal frequency division multiplexing (OFDM) according to some aspects.

Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones of the carrier.

The resource grid 304 may be used to schematically represent time-frequency resources for a given antenna port. That is, in a multiple-input, multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal.

Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs for downlink, uplink, or sidelink transmissions typically involves scheduling one or more resource elements 406 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
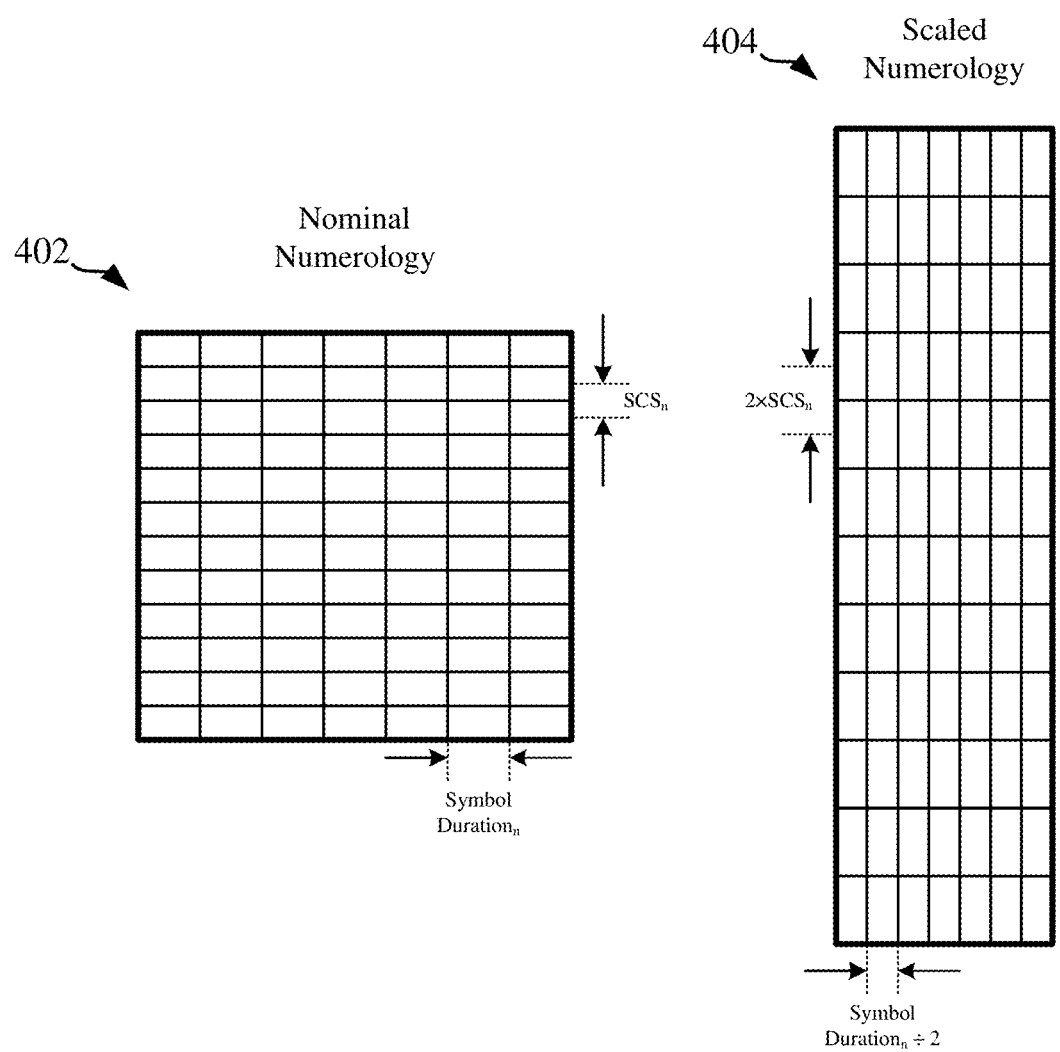
FIG. 4 is a schematic illustration of an OFDM air interface utilizing a scalable numerology according to some aspects.

To illustrate this concept of a scalable numerology, FIG. 4 shows a first RB 402 having a nominal numerology, and a second RB 404 having a scaled numerology. As one example, the first RB 402 may have a 'nominal' subcarrier spacing ($SCS_n$) of 30 kHz, and a 'nominal' symbol duration$_n$ of 333 µs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 µs.

In order for a receiving device to reliably demodulate a received control channel or data channel, the receiving device may first determine the effective channel through which the control or data information signal traveled. As discussed above, one of the reference signals that may be included in both uplink and downlink transmissions is the demodulation reference signal DMRS. The DMRS is multiplexed with information-bearing channels within a given slot. A receiving device utilizes the DMRS to characterize the channel and perform coherent demodulation of the received information-bearing channel.

Some aspects of the present disclosure relate to a physical slot structure for a slot that includes a DMRS. It is to be understood that the various aspects of this disclosure can be applied to both uplink and downlink channels. Although some examples below focus on downlink transmissions, e.g., of the PDSCH, these are merely detailed examples provided herein for ease of discussion. The details of a given implementation may be applied as discussed herein to both uplink and downlink slots that include a DMRS.

According to some aspects, a DMRS may be mapped into a slot carrying downlink transmissions on the PDSCH according to two general types, referred to as PDSCH mapping type A and PDSCH mapping type B. In PDSCH mapping type A, the DMRS is mapped to a fixed location within the slot, defined relative to the start of the slot. And in PDSCH mapping type B, the DMRS is mapped to a location within the slot defined relative to the start of the data transmission within that slot (i.e., relative to the start of the scheduled PDSCH resources in that slot).

Generally, a front-loading of the DMRS may be implemented to provide for reduced latency. That is, by providing the DMRS as early as possible within a slot (e.g., in the first one or two OFDM symbols of a data region of a slot), a receiving device can begin its process of channel estimation based on the DMRS earlier. This provides for earlier demodulation of the information-bearing REs.

Because a receiving device utilizes the DMRS for reliable demodulation of received control information and/or data traffic, it can be seen that the time between the transmission of the DMRS and the transmission of the traffic affects this reliability, e.g., for conditions that cause rapid variations in the channel. For example, a fast-moving UE, such as one in a train or motor vehicle, may experience substantial channel variations during the time that passes from the beginning of the slot to the end of the slot. In the field, it is common to utilize a parameter called the Doppler frequency $\Delta f$ to understand the effects of the speed of the receiving device on the channel, e.g., according to an equation shown below.

$$\Delta f = \frac{v}{c} f$$

Here, v refers to the speed (or velocity) of the receiving device or a relative speed of the receiving device to a source of waves; c is the speed of light; and f is the carrier frequency. The speed may be determined utilizing any suitable means, including but not limited to the use of a global positioning satellite (GPS) sensor, etc.

In circumstances with rapid changes in channel conditions, or with high Doppler frequency $\Delta f$, the front-loaded DMRS, if left unchanged, may lead to reduced reliability in demodulation of traffic carried on OFDM symbols long after the DMRS. Within the present disclosure, reference to Doppler parameters may refer to a Doppler frequency $\Delta f$, or any other suitable parameter indicating changes in channel conditions relevant to the determination of a DMRS pattern within a slot, within a set of aggregated slots when utilizing slot aggregation, within a set of bundled slots when utilizing DMRS bundling, and/or within a set of shared slots when utilizing DMRS sharing. Slot aggregation, DMRS bundling, and DMRS sharing are each described below. In a further aspect of the disclosure, reference to a Doppler parameter may additionally or alternatively refer to a Doppler-related parameter, or any other suitable parameter requesting the base station to change the DMRS pattern as described herein.

In some aspects, adaptive transmissions of the DMRS within a slot may be implemented. That is, a network can vary the location of the DMRS within a slot to some extent. By utilizing this adaptability, a conventional 5G NR network can provide for improved demodulation even in situations with a high Doppler frequency, or with the existence of rapid changes in channel conditions.

Figure 5:
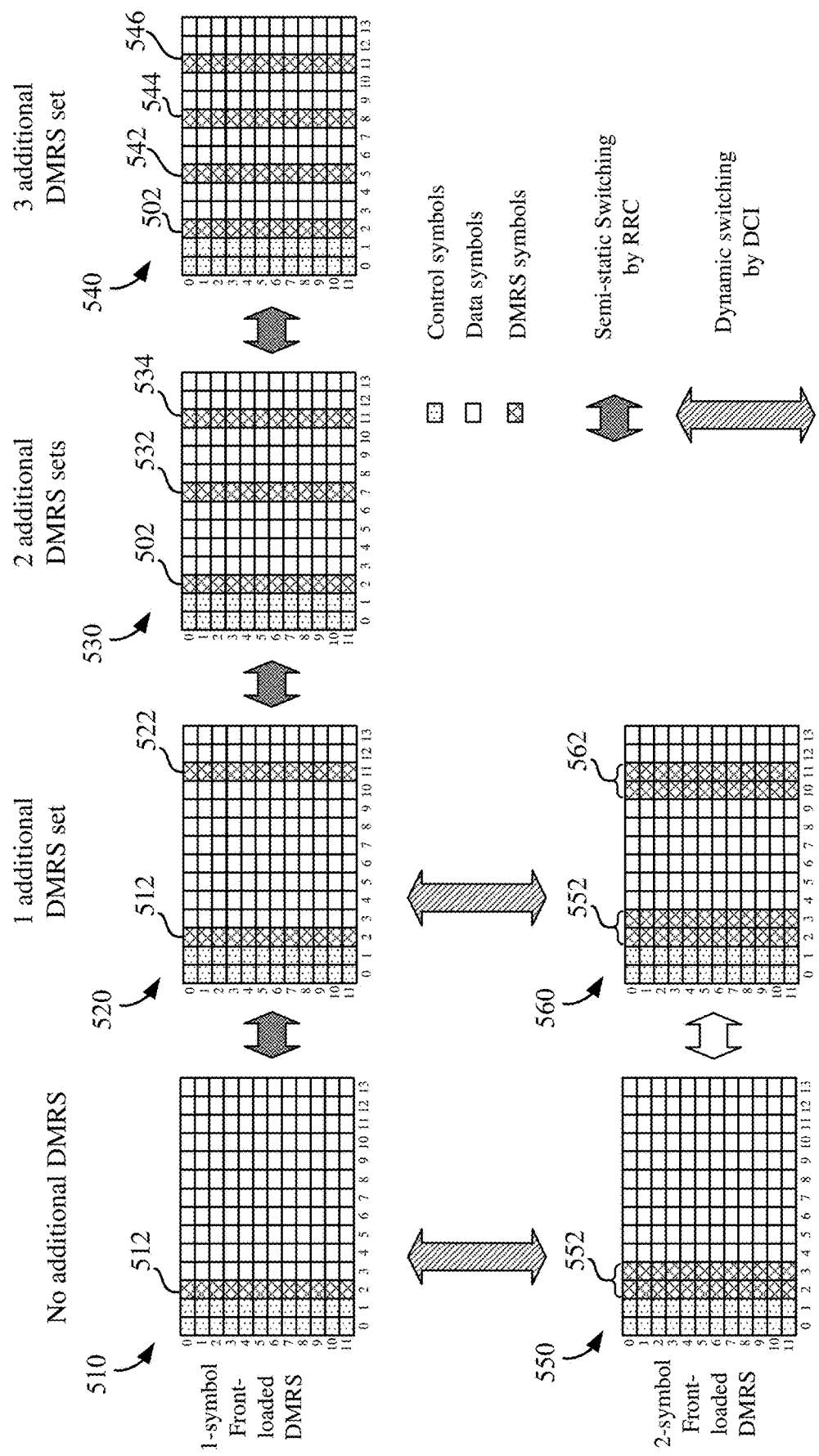
FIG. 5 is an illustration of some examples of flexible DMRS configuration within a slot according to some aspects.

FIG. 5 provides an illustration of some of the flexibility offered in existing 3GPP specifications for DMRS allocation within a slot. According to these specifications, a nominal front-loaded DMRS may be located in the first OFDM symbol of the data region of a slot, or in a 2-symbol front-loaded DMRS, the DMRS may be located in the first two OFDM symbols of the data region of a slot. Furthermore, up-to three additional DMRS symbols within a given slot can be configured for the high Doppler frequency case.

In a given implementation, a base station selects a particular DMRS allocation and informs receiving devices of this allocation. As shown in the illustration of FIG. 5, the base station can alter this allocation between the available configurations utilizing suitable control signaling. For example, the base station can dynamically switch between the 1-symbol front-loaded DMRS and the 2-symbol front-loaded DMRS utilizing downlink control information (DCI). For example, if a first slot is configured for 1-symbol front-loaded DMRS, then a second slot, subsequent to the first slot, can be configured for 2-symbol front-loaded DMRS by including DCI in the PDCCH of the second slot indicating the 2-symbol front-loaded DMRS Furthermore, existing 3GPP specifications provide for 1, 2, or 3 additional OFDM symbols for carrying a DMRS in high Doppler frequency cases. For example, a first 1-symbol DMRS configuration 510 with the 1-symbol front-loaded DMRS configuration having an OFDM symbol 512 with the DMRS can be switched to a second 1-symbol DMRS configuration 520 to carry 1 additional OFDM symbol 522 with the DMRS in the $11^{th}$ symbol of a slot; or to a third 1-symbol DMRS configuration 530 to carry 2 additional OFDM symbols 532 and 534 with the DMRS in the $7^{th}$ and $11^{th}$ symbols of a slot; or to a fourth 1-symbol DMRS configuration 540 to carry 3 additional OFDM symbols 542, 544, and 546 with the DMRS in the $5^{th}$, $8^{th}$, and $11^{th}$ symbols of a slot. And further, a first 2-symbol DMRS configuration 550 with the 2-symbol front-loaded DMRS configuration having two OFDM symbols 552 with the DMRS can be switched to a second 2-symbol DMRS configuration 560 to carry 2 additional OFDM symbols 562 with the DMRS in the $10^{th}$ and $11^{th}$ symbols of a slot. The base station can utilize suitable higher-layer signaling (e.g., UE-specific radio resource control (RRC) signaling) to switch between these configurations with one or more additional DMRS symbols in a semi-static fashion (e.g., this switching may not be dynamically performed from slot-to-slot, but may be switched in a somewhat slower manner over a suitable number of slots).

One feature of a 5G NR RAN is that higher frequency bands, including FR2 and higher. In general, when utilizing a lower frequency range, a slot duration is likely to have a longer time duration than when utilizing a higher frequency range. That is, in higher frequency ranges, the subcarrier spacing (SCS) is likely to be larger (e.g., 960 kHz, 1.92 MHz, 3.84 MHz). And, as discussed above, to maintain orthogonality of the OFDM subcarriers, scaling the SCS up goes with scaling the OFDM symbol length down.

According to some aspects for NR, channel formats for FR1, FR2, and higher frequency ranges, including FR4 or higher, may be defined. These higher frequency ranges are generally understood to have an even higher SCS than used in FR1 and FR2, and accordingly, even shorter slot durations. For example, while FR2 is specified for an SCS up to 120 kHz, FR4-a or FR4-1 and FR4 may be configured for an SCS of 960 kHz or 1.9 MHz. With these high SCS configurations, the slot duration will be significantly short compared to the slot duration in FR2.

With such a short slot duration, the number of PDCCH monitoring occasions may increase. That is, a number of times at which a UE monitors the channel for downlink control information directed to such a UE may increase. Accordingly, the power consumption for such a UE may also increase, e.g., due to monitoring for the PDCCH more frequently. Moreover, due to such a very short slot duration, the chance of a base station sending multiple PDSCHs to the same UE may increase in FR4-a or FR4-1 and FR4 when compared to FR1/FR2. Accordingly, slot aggregation to aggregate a set of two or more consecutive slots may be utilized for FR4-a or FR4-1 and FR4, where single control information may be communicated for the multiple aggregated slots instead of communicating control information for each slot, thereby conserving power and resources.

Figure 6:
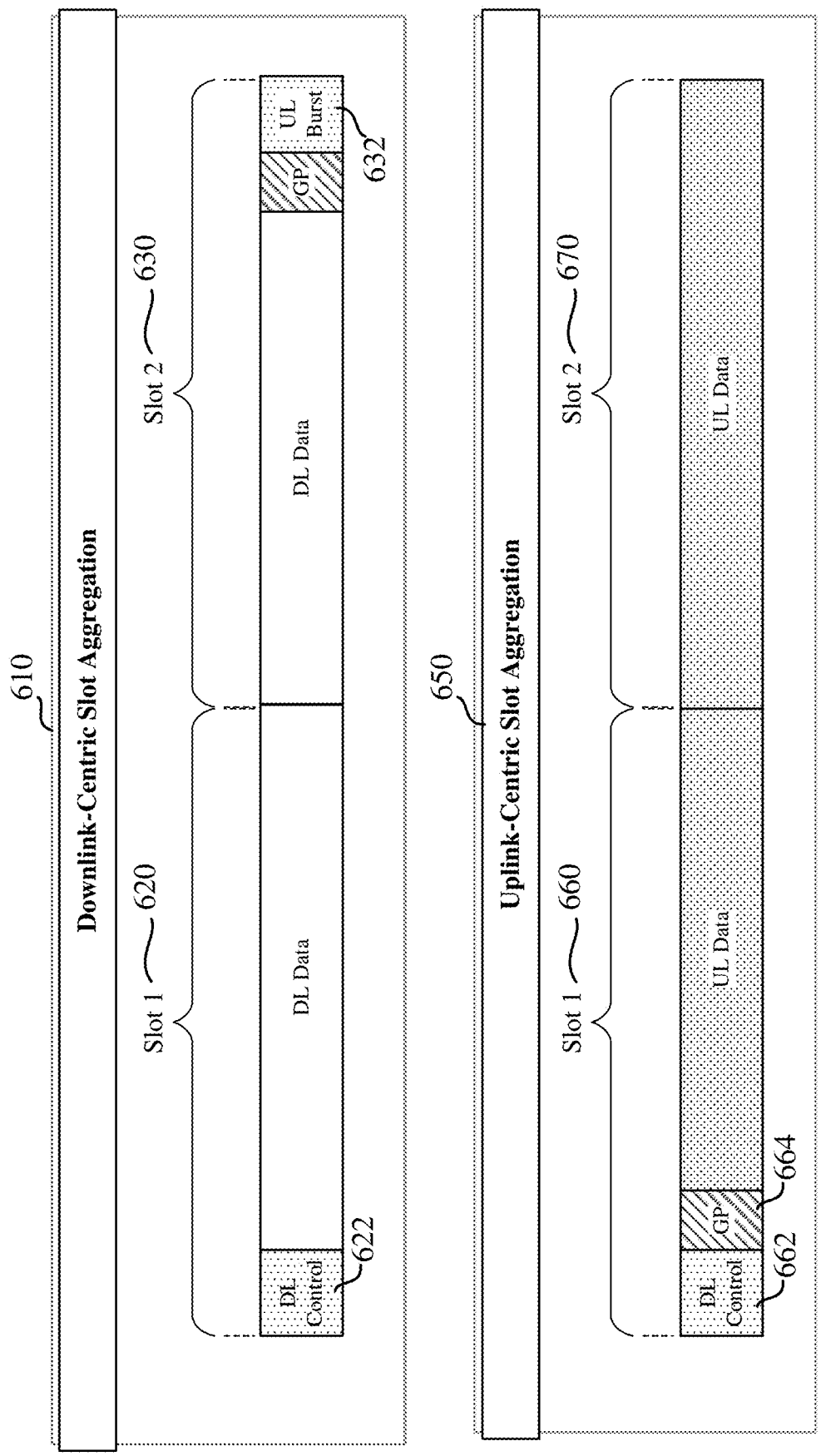
FIG. 6 is an illustration of two examples of carriers configured for slot aggregation according to some aspects.

FIG. 6 is a simplified illustration of an example of slot aggregation. In a first example 610, two downlink-centric slots are aggregated. A downlink-centric slot is referred to as a downlink-centric slot because a majority (or, in some examples, a substantial portion) of the slot includes downlink data. Similarly, an uplink-centric slot is referred to as an uplink-centric slot because a majority (or, in some examples, a substantial portion) of the slot includes uplink data.

As seen in the illustration, by aggregating two downlink-centric slots 620 and 630, downlink control information 622 corresponding to both slots 620 and 630 is provided in the first slot 620, and the second slot 630 omits inclusion of downlink control information. Further, the UE is provided an opportunity for an uplink transmission during an uplink burst period 632 at the end of the second slot 630. In a second example 650, two uplink-centric slots are aggregated. As seen in the illustration, by aggregating two uplink-centric slots 660 and 670, downlink control information 662 corresponding to both slots 660 and 670 is provided in the first slot 660, and the second slot 670 omits inclusion of downlink control information. Further, the UE is provided resources for uplink transmission following a guard period 664 after the downlink portion of the first slot 660 for receiving the downlink control information 662, and throughout the second slot 670.

While these examples in FIG. 6 show aggregation of two slots, any suitable number of slots might be aggregated according to a particular example or implementation.

Figure 7:
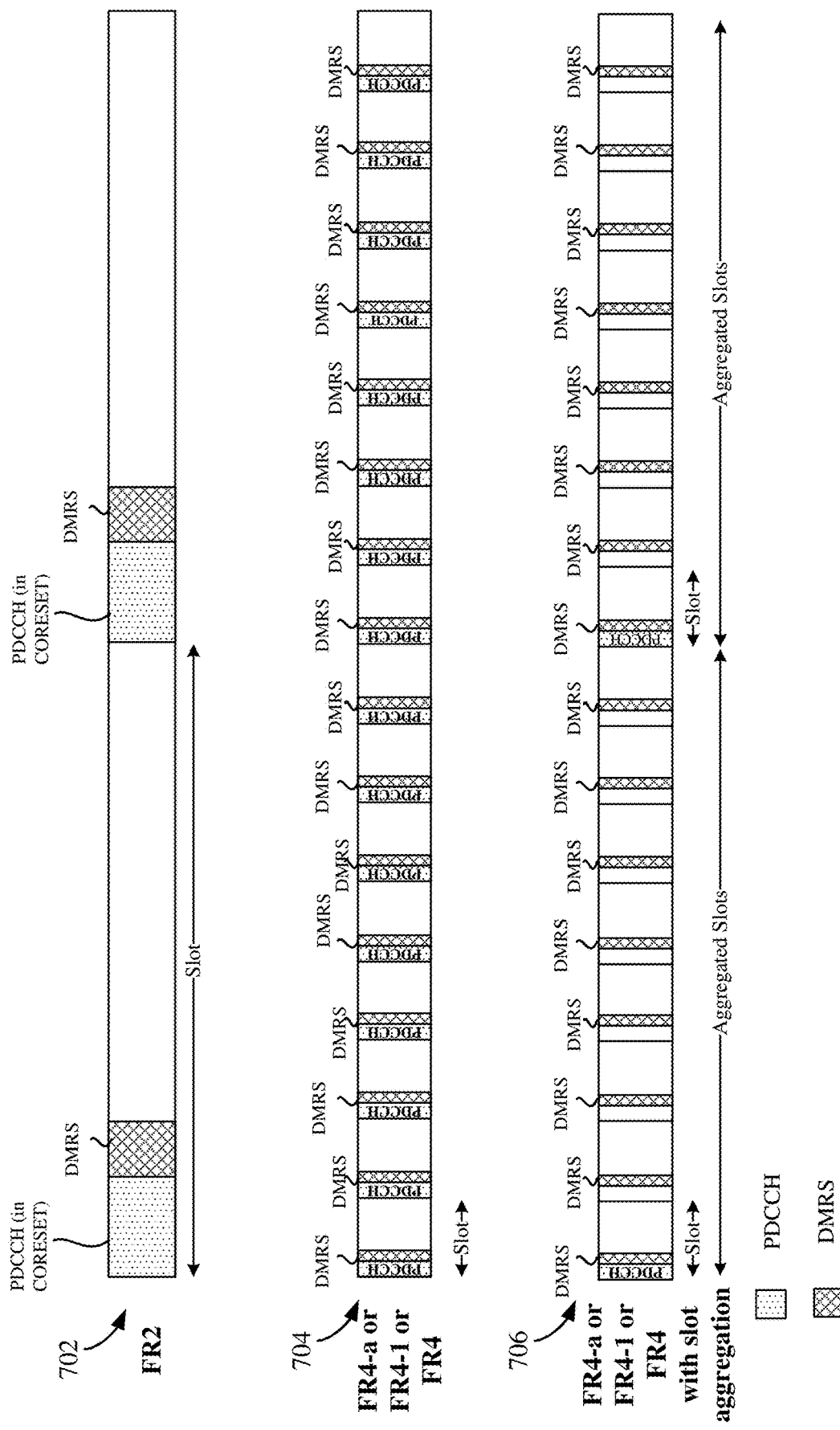
FIG. 7 is another illustration of carriers configured for slot aggregation, showing additional detail of a front-loaded DMRS according to some aspects.

Referring now to FIG. 7, three example carriers having different slot configurations are shown. In a first carrier 702, corresponding to FR2 with a 120 kHz SCS, two slots having a front-loaded DMRS are illustrated. As seen in the first carrier 702, each of the two slots includes one or two OFDM symbols at the beginning of the data portion of the respective slot that carry the DMRS. Because the DMRS is front-loaded for each slot, with the relatively long slot durations, a high Doppler frequency scenario may result in the DMRS being less effective, especially near the end of each slot.

In the second carrier 704, corresponding to FR4-a or FR4-1 or FR4 with a 960 kHz SCS, each of the slots includes one or two OFDM symbols at the beginning of the data portion of the respective slot that carry the DMRS. In this second carrier 704, however, because the slot duration is shorter than that of the first example 702, the front-loaded DMRS may be less problematic even in a relatively high Doppler frequency scenario.

In the third carrier 706, the same basic configuration as the second example 704 is utilized, corresponding to FR4-a or FR4-1 or FR4 with a 960 kHz SCS. However, in the third carrier 706, slot aggregation is used, aggregating eight (8) consecutive slots together. Accordingly, only one slot (e.g., the first slot) in each eight (8) slots includes the PDCCH. Further, as shown in the illustration, the third carrier 706 provides for the front-loaded DMRS in each of the aggregated slots.

In these examples shown in FIG. 7, only the front-loaded DMRS is shown. However, it is to be understood that the additional DMRS as described above and illustrated in FIG. 5 may be utilized in any of the illustrated slots.

According to an aspect of the present disclosure, a network may be configured to be capable of treating DMRS allocation across multiple slots in the same or in a similar manner as the conventional treatment of DMRS allocation within a particular slot, as described above and illustrated in FIG. 5. For example, a base station may be configured to select DMRS allocation across a plurality of slots, particularly in a slot aggregation scenario. In a further aspect, a base station may select the DMRS allocation across multiple slots based on one or more suitable parameters such as a Doppler frequency Δf and/or a rate of change of channel conditions seen by a receiving UE. In this way, even with the reduced slot duration that may occur in higher frequency bands, DMRS allocations can be efficiently managed based on the Doppler frequency or rate of change of channel conditions.

In general, a UE may not use DMRSs across different slots for channel estimation (e.g., interpolation between two adjacent slots). This is because the precoding (including analog beamforming) applied to the DMRS can be different from one slot to the next. For example, referring to FIG. 8, the first carrier 802 utilizes slot aggregation with no restrictions on precoding. In the first carrier 802, each slot includes a front-loaded DMRS as described above. Because there is no precoding restrictions in the first carrier 802, different types of precoding may be utilized for DMRSs for different slots. Different patterns of the DMRSs in the first carrier 802 are utilized to indicate that different precoding is utilized for the respective DMRSs in sequential slots. In general, a UE utilizes the DMRS(s) within a given slot for demodulation of channels in that same slot.

In an aspect, some systems, such as NR, may support bundling of DMRSs in the time domain across one or more slots. With DMRS bundling, the same precoder may be used across the data channels of different scheduling units (e.g. time instants or slots). That is, the DMRS may be coherently transmitted over different time instants (e.g., over different slots). For example, the DMRS bundling may be applied to a set of two or more slots (e.g., aggregated slots) such that the DMRSs in the set of two or more slots may be precoded according to the same precoder. In this manner, a UE can enhance channel estimation performance. For example, at a receiving device (e.g., UE), the DMRS over different time instants can be coherently filtered to enhance the accuracy of channel estimation.

When DMRS bundling is configured, a receiving device may perform (joint) channel estimation based on DMRS(s) received across multiple slots, as opposed to performing channel estimation separately for each individual slot based on the DMRS(s) received in that slot. For example, referring again to FIG. 8, a second carrier 804 is illustrated as an example of DMRS bundling with slot aggregation. In the second carrier 804, the same precoding is applied to the DMRSs per slot aggregation. In this second carrier 804, the same pattern is illustrated across a series of aggregated slots to indicate that the same precoding is applied to the DMRS in the respective slots per slot aggregation. In the second carrier 804, the DMRS bundling is applied per slot aggregation such that one type of precoding is applied to the DMRSs in the first slot aggregation and another type of precoding is applied to the DMRSs in the second slot aggregation. However, it is understood that, in another example, one type of precoding may be applied to two or more slot aggregations.

In slot aggregation, a UE may receive an indication (e.g., parameter(s) in the DCI) that the same OFDM symbol allocation for carrying the DMRS, and the same precoding for the DMRS, is applied to each slot of a set of consecutive aggregated slots. The base station may send such an indication to the UE.

As discussed above, if a UE is moving slowly or remains stationary, the channel may not change rapidly. In this case, if slot aggregation is used with the same precoding within the aggregated slots, it may not be necessary to transmit a DMRS in every slot. That is, a transmitting device may transmit a DMRS less frequently, and a receiving device can rely on a received DMRS for multiple slots while decoding information-bearing channels for a relatively extended time over the multiple slots. This is referred to as DMRS sharing, where a DMRS received in one slot may be used/shared for one or more subsequent slots that do not include any DMRS. In an example, the one or more subsequent slots sharing the DMRS received in the one slot may be consecutive slots to the one slot receiving the DMRS.

Figure 8:
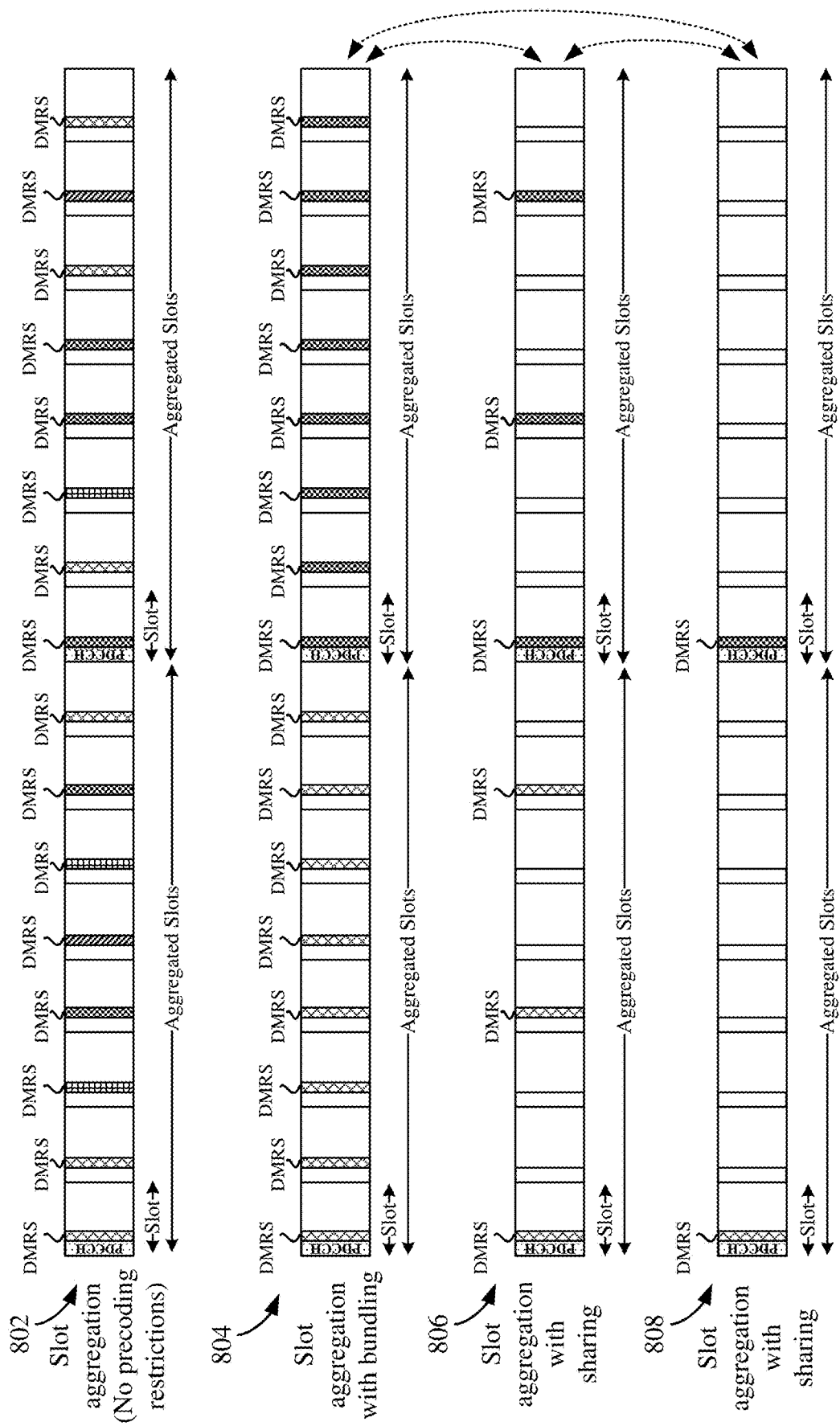
FIG. 8 is an illustration of some examples of carriers configured for DMRS bundling and DMRS sharing, and an alteration of DMRS configurations according to some aspects.

Still referring to FIG. 8, third and fourth carriers 806 and 808 show examples that implement DMRS sharing as well as DMRS bundling. Both illustrated examples implement slot aggregation with DMRS bundling. In the third and fourth carriers 806 and 808, the same pattern is illustrated across a series of aggregated slots to indicate that the same precoding is applied to the DMRS in the respective slots per slot aggregation. In the third carrier 806, the DMRS bundling is applied per slot aggregation such that one type of precoding is applied to the DMRSs in the first slot aggregation and another type of precoding is applied to the DMRSs in the second slot aggregation. Further, in the fourth carrier 808, the DMRS bundling is applied per slot aggregation such that one type of precoding is applied to the DMRSs in the first slot aggregation and another type of precoding is applied to the DMRSs in the second slot aggregation. However, it is understood that, in another example, one type of precoding may be applied to two or more slot aggregations Additionally, in the third carrier 806, although slot aggregation aggregates 8 slots, DMRS sharing causes a front-loaded DMRS to be transmitted in each of the first, fourth, and seventh slots among each group of 8 aggregated slots, while no DMRS is transmitted in the second, third, fifth, and eighth slots. Thus, a receiving device can rely on the front-loaded DMRS in the first slot for demodulating channels in the first through third slots; it can rely on the front-loaded DMRS in the fourth slot for demodulating channels in the fourth through sixth slots; and it can rely on the front-loaded DMRS in the seventh slot for demodulating channels in the seventh and eighth slots. In the fourth carrier 808, DMRS sharing is configured such that a front-loaded DMRS is transmitted only in the first slot of 8 aggregated slots, while no DMRS is transmitted in the rest of the slots of the 8 aggregated slots. Thus, a receiving device can rely on the front-loaded DMRS in the first slot for demodulating channels in the first through eighth slots. According to an aspect of this disclosure, this configuration may be utilized most effectively when a receiving device is substantially static or stationary (e.g., relative to the base station), such that the channel characteristics do not substantially vary over the duration of the aggregated slots.

According to an aspect of the present disclosure, a base station or scheduling entity may vary a pattern of DMRS allocation across a set of aggregated slots according to a detected Doppler frequency Δf, and/or according to a detected high rate of change of channel characteristics. For example, for a higher Doppler frequency Δf, a base station may implement a pattern with a higher number of DMRSs, or an increased frequency of DMRS transmissions, across multiple slots (e.g., per slot aggregation).

Although the examples illustrated in FIG. 8 only show a front-loaded DMRS in any given slot, it is to be understood that the various aspects of this disclosure are not limited only to a front-loaded DMRS in a given slot. That is, in addition to varying which slot or slots, within a set of aggregated slots, include a front-loaded DMRS, a base station may vary a pattern of DMRS allocation within each slot, as described above and illustrated in FIG. 5.

For example, as illustrated in FIG. 8, a base station may switch between patterns of DMRS allocation based on a detected Doppler frequency, as shown in the dotted arrows at the right-hand side of the illustration. In one example, if a Doppler frequency is low (e.g., less than a low threshold), indicating a substantially stationary UE (e.g., relative to the base station), the base station may select a DMRS allocation pattern as shown in the fourth carrier 808. If a Doppler frequency is high (e.g., greater than a high threshold), indicating a relatively rapidly moving UE (e.g., relative to the base station), the base station may select a DMRS allocation pattern as shown in the second carrier 804. And if a Doppler frequency is neither low nor high (e.g., between the low and high thresholds), the base station may select a DMRS allocation pattern as shown in the third carrier 806.

Figure 9:
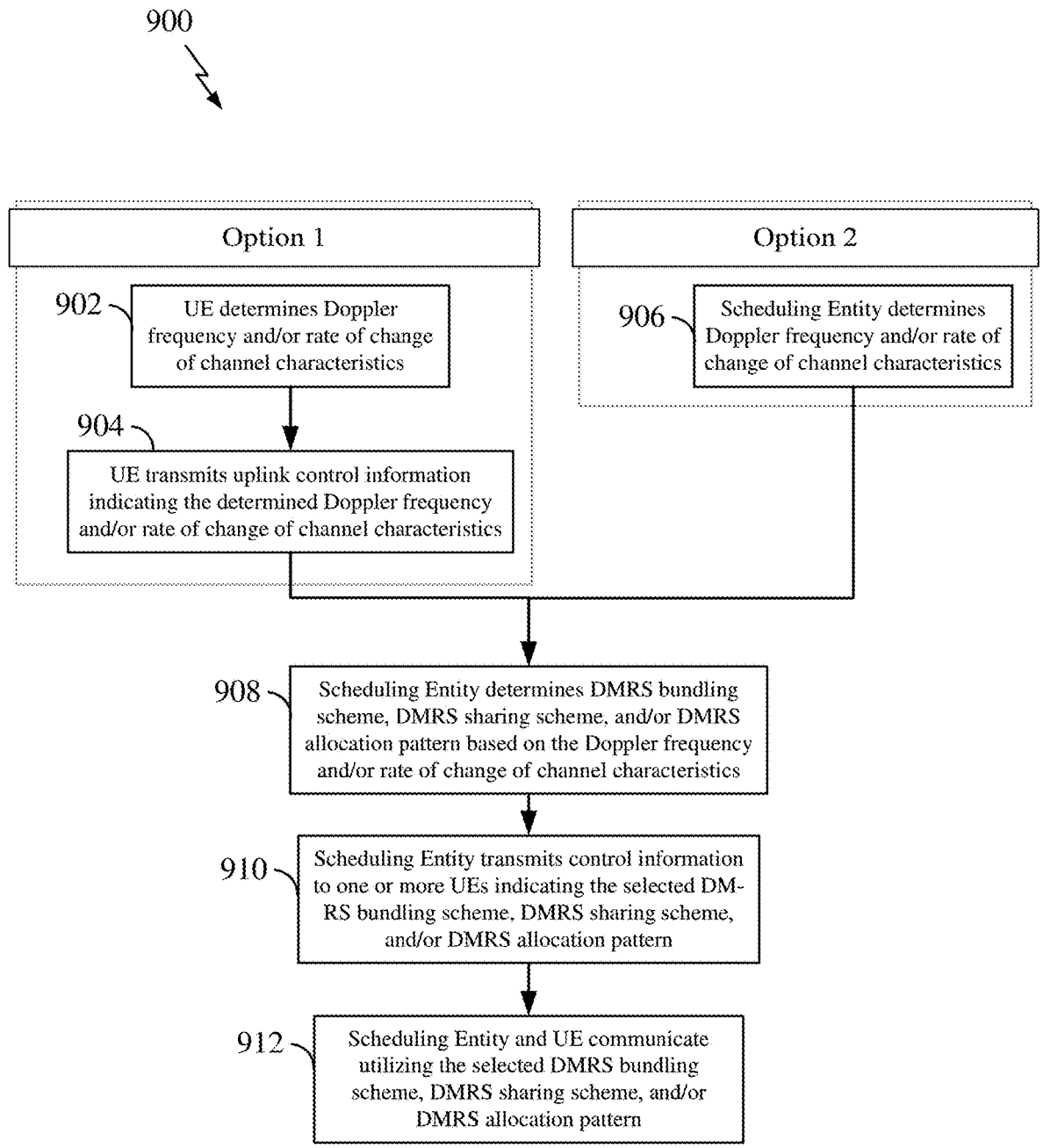
FIG. 9 is a flow chart illustrating an exemplary process for determining a DMRS configuration according to Doppler parameters according to some aspects.

FIG. 9 is a flow chart 900 illustrating an exemplary process for controlling a reference signal pattern based on Doppler parameters according to some aspects of the present disclosure.

In one aspect of the disclosure, illustrated at block 902, a UE may be configured to determine an estimate of the Doppler frequency Δf, and/or to determine an estimate of a rate of change of channel characteristics based on one or more received downlink channels and/or downlink reference signals. For example, the UE may utilize a DMRS carried in a PDSCH, or in a PDCCH, for estimation of a rate of change of channel characteristics. Any suitable channel characteristic may be utilized for this determination, including but not limited to a received power, a signal to noise ratio, etc. Here, once the UE has determined an estimate of the Doppler frequency Δf, and/or an estimate of a rate of change of channel characteristics, at block 904, the UE may transmit information on an uplink channel (e.g., as feedback) to a base station to indicate the Doppler frequency and/or the estimate of the rate of change of channel characteristics. In one example, such information may be transmitted via a PUSCH or a PUCCH.

In another aspect of the disclosure, illustrated at block 906, the base station (e.g., a gNB) or scheduling entity may be configured to determine an estimate of the Doppler frequency Δf, and/or to determine an estimate of a rate of change of channel characteristics based on one or more received uplink channels and/or uplink reference signals. For example, the base station may utilize a DMRS carried in a PUSCH, or in a PUCCH, for estimation of a rate of change of channel characteristics. As above, any suitable channel characteristic may be utilized for this determination, including but not limited to a received power, a signal to noise ratio, etc.

Once the base station has information about the Doppler frequency Δf or a rate of change of channel characteristics, either by determining this parameter itself, or receiving feedback from a UE indicating this parameter, at block 908 the base station may then determine a DMRS bundling scheme, a DMRS sharing scheme, and/or a DMRS allocation pattern. Examples of the DMRS bundling scheme and the DMRS sharing scheme are illustrated in FIG. 8 and explained above, and the examples of the DMRS allocation pattern are illustrated in FIGS. 5, 7, and 8 and explained above. These DMRS bundling/sharing/allocation determinations may correspond to one or both of uplink and/or downlink channels.

Once the base station has made such a determination of DMRS bundling/sharing/allocation schemes, at block 910 the base station may accordingly inform a given UE about (and the UE receives) the selected schemes (including a DMRS pattern(s)) utilizing any suitable signaling from the scheduling entity to the UE. For example, the base station may transmit, and the UE may receive, control information dynamically indicating the selected scheme. In one example, the base station may utilize DCI carried in a PDCCH to indicate the selected schemes. In this case, the DCI may be carried in the same slot in which the new scheme begins to be utilized, enabling a fast, dynamic switching between different schemes. In another example, the base station may utilize somewhat slower, semi-static forms of signaling that may not enable per-slot changing of the DMRS allocation patterns. For example, the base station may utilize a suitable MAC-CE, RRC signaling, etc., which are generally carried in the PDSCH portion of a slot. In this example, the DMRS scheme may be implemented in a later slot or slots.

According to a further aspect of this disclosure, the DMRS pattern utilized for a retransmission (e.g., a HARQ retransmission, described above) may be different from the DMRS pattern utilized in an initial transmission. For example, a change in the DMRS pattern between the initial transmission and the retransmission of an information packet may be triggered based on feedback from a receiving device (e.g., UE).

Figure 10:
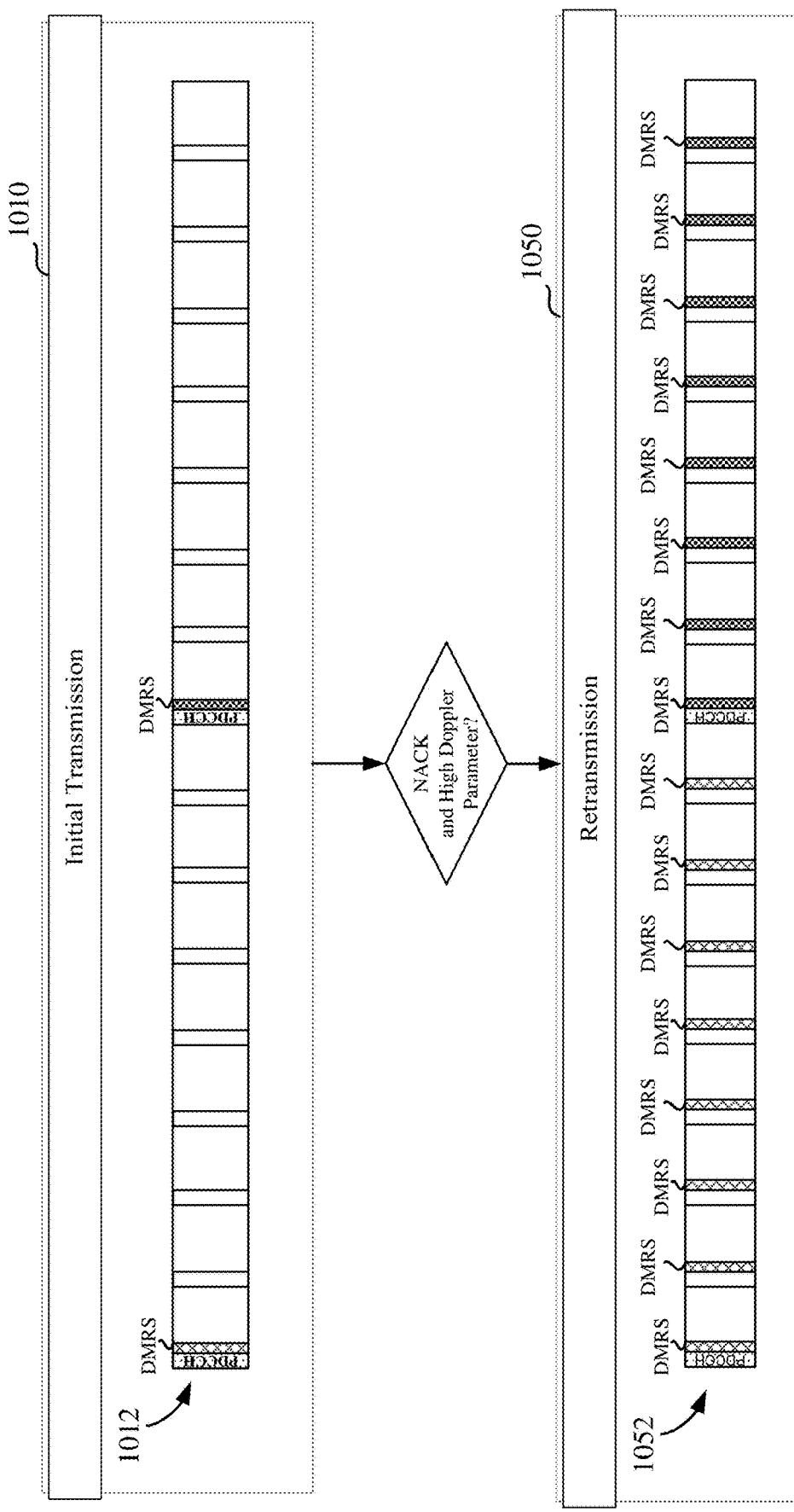
FIG. 10 is an illustration of an example of altering a DMRS configuration for a retransmission of a packet based on Doppler parameters according to an aspect.
Figure 11:
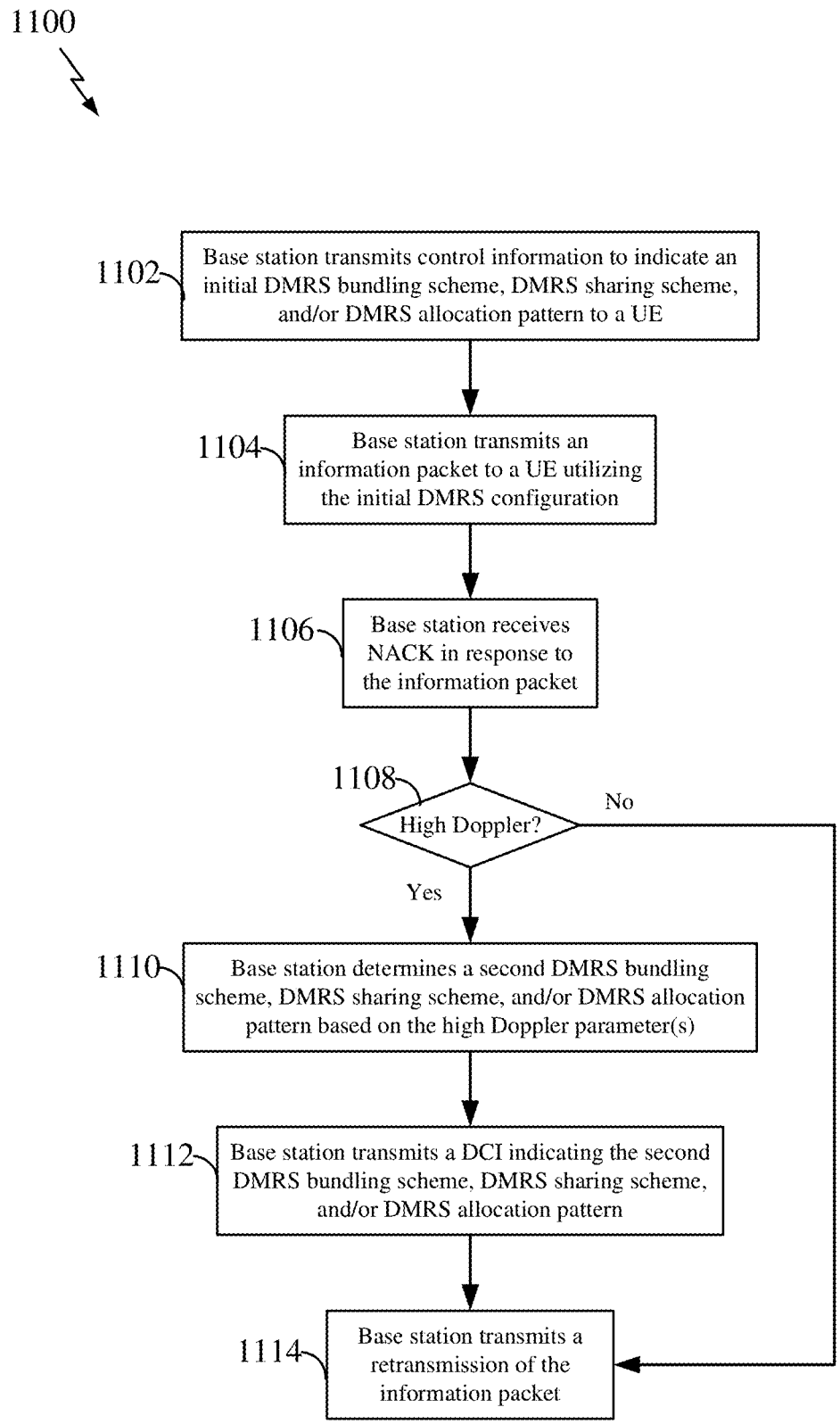
FIG. 11 is a flow chart illustrating an exemplary process for altering a DMRS configuration for a retransmission of a packet based on Doppler parameters according to some aspects.

FIG. 10 is an illustration of one example scenario, provided to illustrate how variation of the DMRS pattern between an initial transmission and a retransmission might be utilized. FIG. 11 is a flow chart 1100 illustrating an example algorithm for determining to vary a DMRS pattern in this manner. In the description below, general reference is made to FIG. 11, and FIG. 10 is pointed to for a visual illustration.

At block 1102, a base station may transmit an initial DMRS configuration including one or more of an initial DMRS bundling scheme, DMRS sharing scheme, and/or DMRS allocation pattern, to one or more UEs utilizing any suitable signaling scheme. For example, this initial DMRS configuration may be a semi-static configuration transmitted utilizing a MAC CE and/or RRC signaling. As used in some aspects of the present disclosure, the initial DMRS configuration may not refer to a first or an earlier configuration in any sequence. Rather, an initial configuration is simply a name of a configuration used to distinguish the initial configuration from a subsequent configuration. At block 1104, the base station may transmit an information packet to a UE utilizing the initial DMRS configuration characterized in block 1102.

For example, as seen in FIG. 10, a base station may transmit an information packet in an initial transmission 1010. In the illustration, the initial transmission 1010 is made on a carrier 1012 that utilizes slot aggregation, with an aggregation of 8 slots. Further, the carrier 1012 is configured with a DMRS configuration utilizing DMRS sharing, where a front-loaded DMRS is provided only in the first slot of each set of aggregated slots. It may further be assumed that the carrier 1012 is configured with DMRS bundling, such that any DMRSs provided within an aggregated set of slots utilize the same precoding.

As described above, the illustrated initial DMRS configuration in FIG. 10 may be suitable for a slow-moving or substantially stationary UE (e.g., relative to the base station), with very little channel variation over time, and with a very low Doppler frequency. Of course, this initial configuration is merely one example, and any suitable DMRS configuration may be utilized.

In some examples, an information packet contained within the initial transmission may fail to be properly received and decoded at the receiving UE. For example, a CRC may fail at the receiving UE, causing an error in the receiving and decoding the initial transmission at the receiving UE. Accordingly, at block 1106, the receiving UE may transmit a NACK, or negative acknowledgment, indicating an unsuccessful decoding of an information packet and to request retransmission of that packet. As described above, a HARQ retransmission procedure may be utilized to retransmit the packet, or information relating to the packet, in response to this failure.

According to an aspect of the present disclosure, at block 1108, when a base station is preparing such a retransmission, the base station may further take into account one or more Doppler parameters to determine whether a DMRS pattern should be changed relative to the initial transmission, for the retransmission. In an aspect, at block 1108, the base station may determine whether the one or more Doppler parameters indicate a Doppler frequency and/or a rate of change of channel conditions exceeding a high Doppler threshold. For example, if the UE determines the one or more Doppler parameters, such as a Doppler frequency and/or a rate of change of channel conditions, the UE may transmit information indicating the one or more Doppler parameters along with the NACK. Of course, this is merely one example. Within the scope of the present disclosure, a UE may utilize any suitable parameter or parameters to determine a cause of the failure to decode a packet, causing the NACK. Whatever the details of a particular implementation, in an aspect of the present disclosure, the UE may transmit a report that the NACK may be related to one or more high Doppler parameters.

If the base station determines that the one or more Doppler parameters indicate a Doppler frequency and/or a rate of change of channel conditions exceeding the high Doppler threshold, at block 1110, the base station may determine a second DMRS bundling scheme, DMRS sharing scheme, and/or DMRS allocation pattern for a slot, or for a set of aggregated slots, for transmission of a HARQ retransmission, based on the high Doppler parameter. In an aspect of the present disclosure, at block 1112 the base station may indicate the change in the DMRS configuration utilizing DCI carried, e.g., in the PDCCH. In this way, a dynamic (as opposed to a semi-static), per-slot alteration of the DMRS bundling scheme, DMRS sharing scheme, and/or DMRS allocation pattern may be implemented for retransmissions.

And at block 1114, the base station may transmit a retransmission of the information packet utilizing the altered DMRS configuration. In this way, if an initial transmission of an information packet fails due to a high Doppler scenario, the probability of success of the retransmission may be improved by altering the DMRS configuration to account for the high Doppler scenario.

In an aspect, if the base station at block 1108 determines that the one or more Doppler parameters indicate a Doppler frequency and/or a rate of change of channel conditions not exceeding the high Doppler threshold, then the base station at block 1114 may transmit a retransmission of the information packet utilizing the initial DMRS configuration without altering it.

For example, as seen in FIG. 10, the base station may transmit the information packet in an retransmission 1050 made on a carrier 1052 that utilizes slot aggregation, with an aggregation of 8 slots. The carrier 1052 in the retransmission 1050 may be generated by the base station based on a second DMRS bundling scheme, DMRS sharing scheme, and/or DMRS allocation pattern for a slot, or for a set of aggregated slots, when the Doppler parameter is high and a NACK is received. The carrier 1052 is not configured with a DMRS configuration utilizing DMRS sharing, but a DMRS is provided for each slot. It may further be assumed that the carrier 1052 is configured with DMRS bundling, such that any DMRSs provided within an aggregated set of slots utilize the same precoding.

Figure 12:
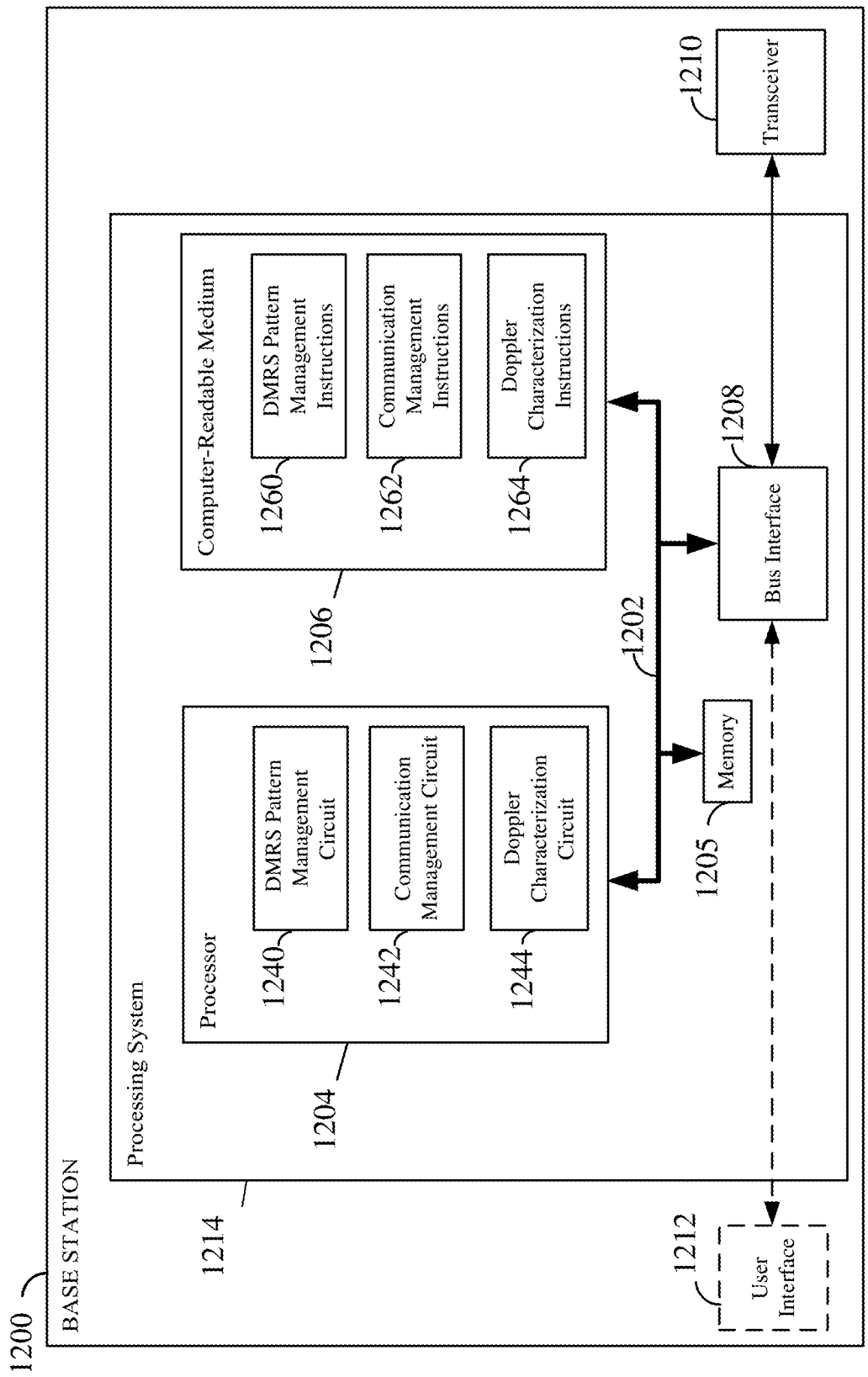
FIG. 12 is a block diagram conceptually illustrating an example of a hardware implementation for a base station or scheduling entity according to some aspects.

FIG. 12 is a block diagram illustrating an example of a hardware implementation for a base station, gNB, or scheduling entity 1200 employing a processing system 1214. For example, the base station 1200 may be a base station as illustrated in any one or more of FIGS. 1 and/or 2.

The base station 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1200 may be configured to perform any one or more of the functions described herein. That is, the processor 1204, as utilized in a base station 1200, may be used to implement any one or more of the processes and procedures described below and illustrated in FIGS. 9, 11, 13, and/or 14. The processor 1204 may in some instances be implemented via a baseband or modem chip and in other implementations, the processor 1204 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable storage medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples, such as a base station.

In some aspects of the disclosure, the processor 1204 may include DMRS pattern management circuitry 1240 configured for various functions, including, for example, determining a DMRS bundling scheme, DMRS sharing scheme, and/or DMRS allocation pattern based on the Doppler frequency and/or rate of change of channel characteristics.

In some aspects, the DMRS pattern management circuitry 1240 may be configured for various functions, including, for example, transmitting first control information indicating an initial DMRS pattern. For example, the DMRS pattern management circuitry 1240 may be configured to implement one or more of the functions described below in relation to FIGS. 13-15, including, e.g., blocks 1302, 1402, and 1502.

In some aspects, the DMRS pattern management circuitry 1240 may be configured for various functions, including, for example, transmitting second control information indicating a subsequent DMRS pattern that is based on one or more Doppler parameters corresponding to the carrier, the subsequent DMRS pattern being different than the initial DMRS pattern. For example, the DMRS pattern management circuitry 1240 may be configured to implement one or more of the functions described below in relation to FIGS. 13-15, including, e.g., blocks 1306, 1412, and 1514.

In some aspects, the DMRS pattern management circuitry 1240 may be configured for various functions, including, for example, setting the subsequent DMRS pattern to include a first number of slots of the plurality of aggregated slots with no DMRS when the one or more Doppler parameters indicates a Doppler frequency exceeding a threshold. For example, the DMRS pattern management circuitry 1240 may be configured to implement one or more of the functions described below in relation to FIG. 14, including, e.g., block 1408.

In some aspects, the DMRS pattern management circuitry 1240 may be configured for various functions, including, for example, setting the subsequent DMRS pattern to include a second number of slots of the plurality of aggregated slots with no DMRS when the one or more Doppler parameters indicates the Doppler frequency being less than or equal to the threshold, wherein the second number is greater than the first number. For example, the DMRS pattern management circuitry 1240 may be configured to implement one or more of the functions described below in relation to FIG. 14, including, e.g., block 1410.

In some aspects, the DMRS pattern management circuitry 1240 may be configured for various functions, including, for example, setting the subsequent DMRS pattern to include a larger number of DMRSs per slot aggregation than the initial DMRS pattern when the NACK is transmitted and the one or more Doppler parameters indicates a Doppler frequency exceeding a threshold. For example, the DMRS pattern management circuitry 1240 may be configured to implement one or more of the functions described below in relation to FIG. 15, including, e.g., block 1512.

In some aspects, the processor 1204 may also include communication management circuitry 1242 to manage communication with a UE.

In some aspects, the communication management circuitry 1242 may be configured for various functions, including, for example, communicating with a user equipment (UE) utilizing a carrier configured according to the initial DMRS pattern. For example, the communication management circuitry 1242 may be configured to implement one or more of the functions described below in relation to FIGS. 13-15, including, e.g., blocks 1304, 1404, and 1504.

In some aspects, the communication management circuitry 1242 may be configured for various functions, including, for example, communicating with the UE utilizing the a subsequent carrier configured according to the subsequent DMRS pattern. For example, the communication management circuitry 1242 may be configured to implement one or more of the functions described below in relation to FIGS. 13-15, including, e.g., blocks 1308, 1414, and 1516.

In some aspects, the communication management circuitry 1242 may be configured for various functions, including, for example, receiving information indicating the one or more Doppler parameters from the UE to determine the one or more Doppler parameters. For example, the communication management circuitry 1242 may be configured to implement one or more of the functions described below in relation to FIG. 14, including, e.g., block 1406.

In some aspects, the communication management circuitry 1242 may be configured for various functions, including, for example, transmitting an information packet utilizing the carrier configured according to the initial DMRS pattern. For example, the communication management circuitry 1242 may be configured to implement one or more of the functions described below in relation to FIG. 15, including, e.g., block 1506.

In some aspects, the communication management circuitry 1242 may be configured for various functions, including, for example, receiving a negative acknowledgment (NACK) indicating an unsuccessful decoding of the information packet. For example, the communication management circuitry 1242 may be configured to implement one or more of the functions described below in relation to FIG. 15, including, e.g., block 1508.

In some aspects, the processor 1204 may further include Doppler characterization circuitry 1244 configured for various functions, including, for example, determining a Doppler frequency Δf and/or a rate of change of one or more channel characteristics.

In some aspects, the Doppler characterization circuitry 1244 may be configured for various functions, including, for example, receiving the one or more Doppler parameters, corresponding to one or more channel characteristics associated with the carrier carrying the unsuccessfully decoded information packet, wherein the subsequent DMRS pattern is based on the one or more received Doppler parameters. For example, Doppler characterization circuitry 1244 may be configured to implement one or more of the functions described below in relation to FIG. 15, including, e.g., block 1510.

The processor 1204 is responsible for managing the bus 1202 and general processing, including the execution of software stored on the computer-readable storage medium 1206. The software, when executed by the processor 1204, causes the processing system 1214 to perform the various functions described below for any particular apparatus. The computer-readable storage medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1206.

The computer-readable storage medium 1206 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1206 may reside in the processing system 1214, external to the processing system 1214, or distributed across multiple entities including the processing system 1214. The computer-readable storage medium 1206 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In one or more examples, the computer-readable storage medium 1206 may further include DMRS pattern management software/instructions 1260 configured for various functions, including, for example, determining a DMRS bundling scheme, DMRS sharing scheme, and/or DMRS allocation pattern based on the Doppler frequency and/or rate of change of channel characteristics.

In some aspects, the DMRS pattern management software/instructions 1260 may be configured for various functions, including, for example, transmitting first control information indicating an initial DMRS pattern. For example, the DMRS pattern management software/instructions 1260 may be configured to implement one or more of the functions described below in relation to FIGS. 13-15, including, e.g., blocks 1302, 1402, and 1502.

In some aspects, the DMRS pattern management software/instructions 1260 may be configured for various functions, including, for example, transmitting second control information indicating a subsequent DMRS pattern that is based on one or more Doppler parameters corresponding to the carrier, the subsequent DMRS pattern being different than the initial DMRS pattern. For example, the DMRS pattern management software/instructions 1260 may be configured to implement one or more of the functions described below in relation to FIGS. 13-15, including, e.g., blocks 1306, 1412, and 1514.

In some aspects, the DMRS pattern management software/instructions 1260 may be configured for various functions, including, for example, setting the subsequent DMRS pattern to include a first number of slots of the plurality of aggregated slots with no DMRS when the one or more Doppler parameters indicates a Doppler frequency exceeding a threshold. For example, the DMRS pattern management software/instructions 1260 may be configured to implement one or more of the functions described below in relation to FIG. 14, including, e.g., block 1408.

In some aspects, the DMRS pattern management software/instructions 1260 may be configured for various functions, including, for example, setting the subsequent DMRS pattern to include a second number of slots of the plurality of aggregated slots with no DMRS when the one or more Doppler parameters indicates the Doppler frequency being less than or equal to the threshold, where the second number is greater than the first number. For example, the DMRS pattern management software/instructions 1260 may be configured to implement one or more of the functions described below in relation to FIG. 14, including, e.g., block 1410.

In some aspects, the DMRS pattern management software/instructions 1260 may be configured for various functions, including, for example, setting the subsequent DMRS pattern to include a larger number of DMRSs per slot aggregation than the initial DMRS pattern when the NACK is transmitted and the one or more Doppler parameters indicates a Doppler frequency exceeding a threshold. For example, the DMRS pattern management software/instructions 1260 may be configured to implement one or more of the functions described below in relation to FIG. 15, including, e.g., block 1512.

In one or more examples, the computer-readable storage medium 1206 may further include communication management software/instructions 1262 configured for various functions, including, for example, managing communication with a UE.

In some aspects, the communication management software/instructions 1262 may be configured for various functions, including, for example, communicating with a user equipment (UE) utilizing a carrier configured according to the initial DMRS pattern. For example, the DMRS pattern management circuitry 1240 may be configured to implement one or more of the functions described below in relation to FIGS. 13-15, including, e.g., blocks 1304, 1404, and 1504.

In some aspects, the communication management software/instructions 1262 may be configured for various functions, including, for example, communicating with the UE utilizing the a subsequent carrier configured according to the subsequent DMRS pattern. For example, the communication management software/instructions 1262 may be configured to implement one or more of the functions described below in relation to FIGS. 13-15, including, e.g., blocks 1308, 1414, and 1516.

In some aspects, the communication management software/instructions 1262 may be configured for various functions, including, for example, receiving information indicating the one or more Doppler parameters from the UE to determine the one or more Doppler parameters. For example, the communication management software/instructions 1262 may be configured to implement one or more of the functions described below in relation to FIG. 14, including, e.g., block 1406.

In some aspects, the communication management software/instructions 1262 may be configured for various functions, including, for example, transmitting an information packet utilizing the carrier configured according to the initial DMRS pattern. For example, the communication management software/instructions 1262 may be configured to implement one or more of the functions described below in relation to FIG. 15, including, e.g., block 1506.

In some aspects, the communication management software/instructions 1262 may be configured for various functions, including, for example, receiving a negative acknowledgment (NACK) indicating an unsuccessful decoding of the information packet. For example, the communication management software/instructions 1262 may be configured to implement one or more of the functions described below in relation to FIG. 15, including, e.g., block 1508.

In one or more examples, the computer-readable storage medium 1206 may further include Doppler characterization software/instructions 1264 configured for various functions, including, for example, determining a Doppler frequency $\Delta f$ and/or a rate of change of one or more channel characteristics. The computer-readable storage medium 1206.

In some aspects, the Doppler characterization software/instructions 1264 may be configured for various functions, including, for example, receiving the one or more Doppler parameters, corresponding to one or more channel characteristics associated with the carrier carrying the unsuccessfully decoded information packet, wherein the subsequent DMRS pattern is based on the one or more received Doppler parameters. For example, Doppler characterization software/instructions 1264 may be configured to implement one or more of the functions described below in relation to FIG. 15, including, e.g., block 1510.

Figure 13:
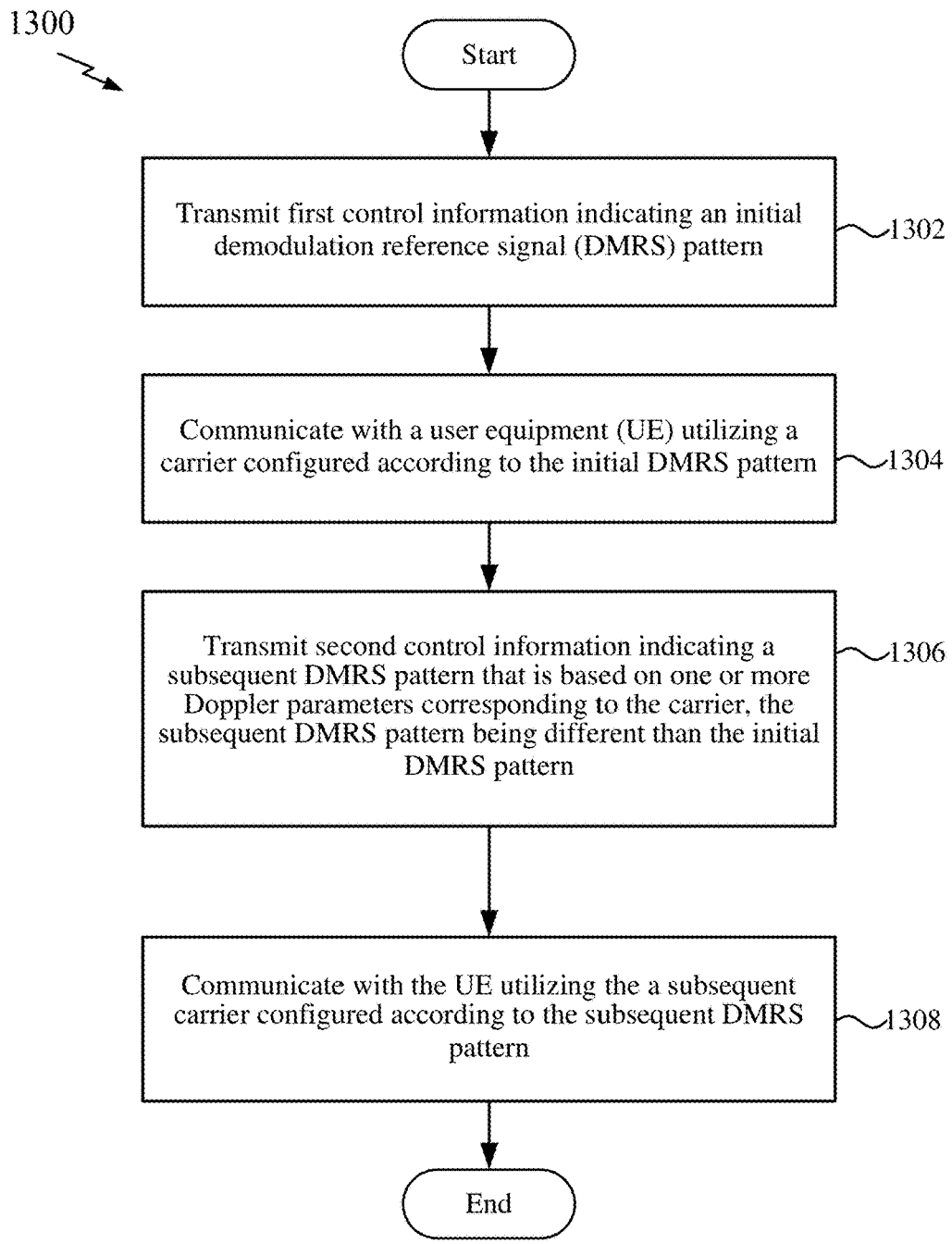
FIG. 13 is a flow chart illustrating an exemplary process for wireless communication according to some aspects.

FIG. 13 is a flow chart illustrating an exemplary process 1300 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the base station 1200 illustrated in FIG. 12. In some examples, the process 1300 may be carried out by any suitable apparatus or means for carrying out the functions or algorithm described below.

At block 1302, the base station 1200 may transmit first control information indicating an initial DMRS pattern. For example, the DMRS pattern management circuitry 1240 shown and described above in connection with FIG. 12 may provide means for transmitting the first control information. In an aspect, the first control information may be one of a dynamic indication of the DMRS pattern, or a semi-static indication of the DMRS pattern. In an aspect, the first control information may be transmitted via at least one of a MAC-CE or an RRC message.

At block 1304, the base station 1200 may communicate with a UE utilizing a carrier configured according to the initial DMRS pattern. For example, the communication management circuitry 1242 shown and described above in connection with FIG. 12 may provide means for communicating with the UE with utilizing the carrier configured according to the initial DMRS pattern.

At block 1306, the base station 1200 may transmit second control information indicating a subsequent DMRS pattern that is based on one or more Doppler parameters corresponding to the carrier, the subsequent DMRS pattern being different than the initial DMRS pattern. For example, the DMRS pattern management circuitry 1240 shown and described above in connection with FIG. 12 may provide means for transmitting the second control information. In an aspect, the second control information may be transmitted via DCI.

At block 1308, the base station 1200 may communicate with the UE utilizing the carrier configured according to the subsequent DMRS pattern. For example, the communication management circuitry 1242 shown and described above in connection with FIG. 12 may provide means for communicating with the UE utilizing the carrier configured according to the subsequent DMRS pattern. In an aspect, the carrier may be configured for slot aggregation to aggregate a plurality of slots, where each of the initial DMRS pattern and the subsequent DMRS pattern may include a respective pattern for DMRS communication across.

In one configuration, the base station 1200 for wireless communication includes means for transmitting first control information indicating an initial DMRS pattern, means for communicating with a UE utilizing a carrier configured according to the initial DMRS pattern, means for transmitting second control information indicating a subsequent DMRS pattern that is based on one or more Doppler parameters corresponding to the carrier, the subsequent DMRS pattern being different than the initial DMRS pattern, and means for communicating with the UE utilizing the carrier configured according to the subsequent DMRS pattern. In one aspect, the aforementioned means may be the processor(s) 1204 shown in FIG. 12 configured to perform the functions recited by the aforementioned means. In another aspect, the aforementioned means may be a circuit or any apparatus configured to perform the functions recited by the aforementioned means.

Figure 14:
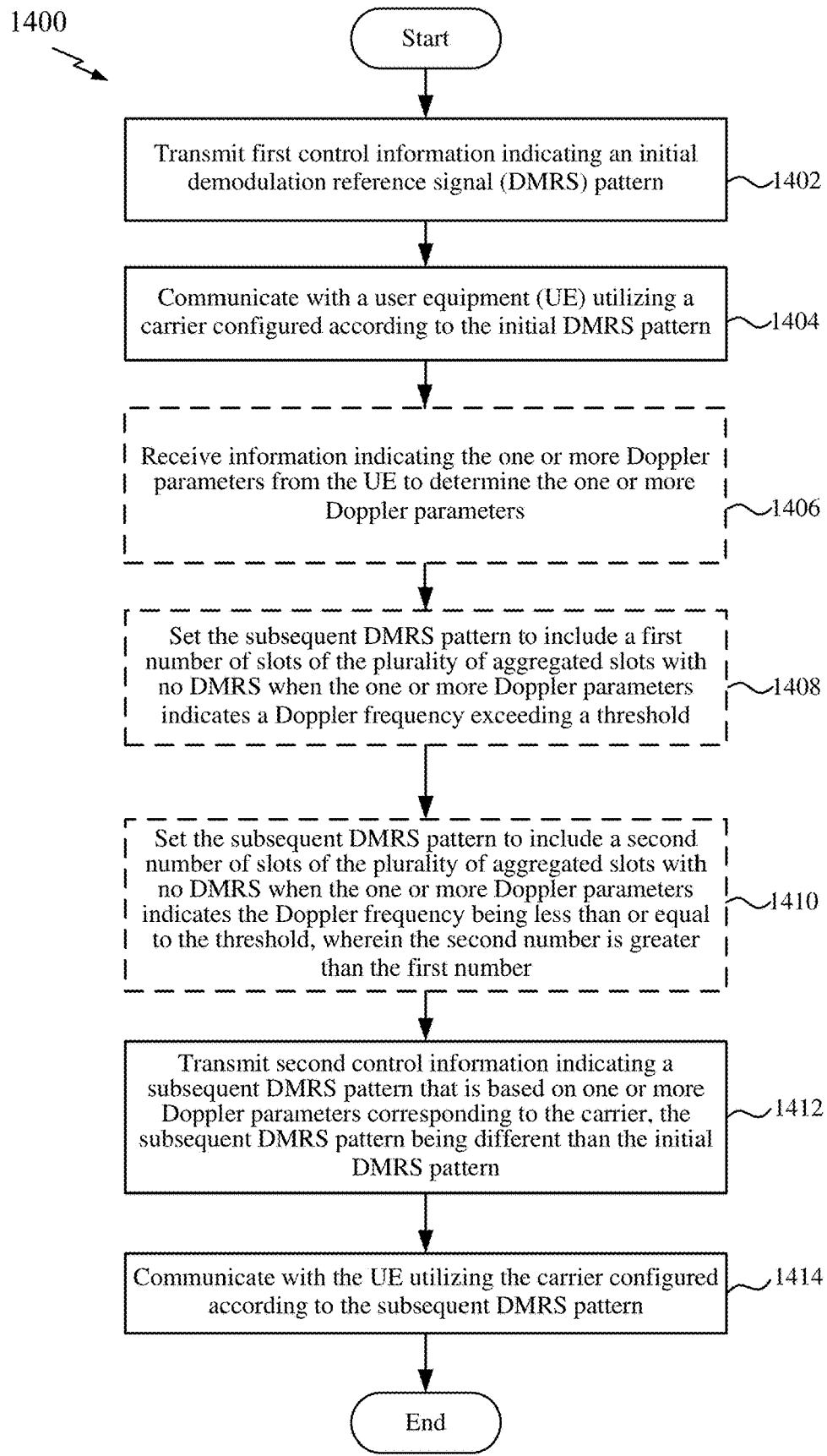
FIG. 14 is a flow chart illustrating an exemplary process for wireless communication according to some aspects.

FIG. 14 is a flow chart illustrating an exemplary process 1400 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the base station 1200 illustrated in FIG. 12. In some examples, the process 1400 may be carried out by any suitable apparatus or means for carrying out the functions or algorithm described below.

At block 1402, the base station 1200 may transmit first control information indicating an initial DMRS pattern. For example, the DMRS pattern management circuitry 1240 shown and described above in connection with FIG. 12 may provide means for transmitting the first control information. In an aspect, the first control information may be one of a dynamic indication of the DMRS pattern, or a semi-static indication of the DMRS pattern. In an aspect, the first control information may be transmitted via at least one of a MAC-CE or an RRC message.

At block 1404, the base station 1200 may communicate with a UE utilizing a carrier configured according to the initial DMRS pattern. For example, the communication management circuitry 1242 shown and described above in connection with FIG. 12 may provide means for communicating with the UE with utilizing the carrier configured according to the initial DMRS pattern.

At block 1406, the base station 1200 may receive information indicating the one or more Doppler parameters from the UE to determine the one or more Doppler parameters. For example, the communication management circuitry 1242 shown and described above in connection with FIG. 12 may provide means for receiving information indicating the one or more Doppler parameters from the UE to determine the one or more Doppler parameters.

In an aspect, at least one of the initial DMRS pattern or the subsequent DMRS pattern may include at least one slot of the plurality of slots with no DMRS, where at least one DMRS in another slot of the plurality of aggregated slots may be used for the at least one slot with no DMRS.

In an aspect, the carrier may include one or more DMRSs in one or more slots of the plurality of slots, the one or more DMRSs being precoded according to a same precoder.

At block 1408, the base station 1200 may set the subsequent DMRS pattern to include a first number of slots of the plurality of aggregated slots with no DMRS when the one or more Doppler parameters indicates a Doppler frequency exceeding a threshold. For example, the DMRS pattern management circuitry 1240 shown and described above in connection with FIG. 12 may provide means for setting the subsequent DMRS pattern.

At block 1410, the base station 1200 may set the subsequent DMRS pattern to include a second number of slots of the plurality of aggregated slots with no DMRS when the one or more Doppler parameters indicates the Doppler frequency being less than or equal to the threshold, where the second number is greater than the first number. For example, the DMRS pattern management circuitry 1240 shown and described above in connection with FIG. 12 may provide means for setting the subsequent DMRS pattern.

At block 1412, the base station 1200 may transmit second control information indicating a subsequent DMRS pattern that is based on one or more Doppler parameters corresponding to the carrier, the subsequent DMRS pattern being different than the initial DMRS pattern. For example, the DMRS pattern management circuitry 1240 shown and described above in connection with FIG. 12 may provide means for transmitting the second control information. In an aspect, the second control information may be transmitted via DCI.

At block 1414, the base station 1200 may communicate with the UE utilizing the carrier configured according to the subsequent DMRS pattern. For example, the communication management circuitry 1242 shown and described above in connection with FIG. 12 may provide means for communicating with the UE utilizing the carrier configured according to the subsequent DMRS pattern. In an aspect, the carrier may be configured for slot aggregation to aggregate a plurality of slots, where each of the initial DMRS pattern and the subsequent DMRS pattern may include a respective pattern for DMRS communication across the plurality of aggregated slots.

In one configuration, the base station 1200 for wireless communication includes means for transmitting first control information indicating an initial DMRS pattern, means for communicating with a UE utilizing a carrier configured according to the initial DMRS pattern, means for transmitting second control information indicating a subsequent DMRS pattern that is based on one or more Doppler parameters corresponding to the carrier, the subsequent DMRS pattern being different than the initial DMRS pattern, and means for communicating with the UE utilizing the carrier configured according to the subsequent DMRS pattern. In an aspect, the base station 1200 may further include means for receiving information indicating the one or more Doppler parameters from the UE to determine the one or more Doppler parameters, means for setting the subsequent DMRS pattern to include a first number of slots of the plurality of aggregated slots with no DMRS when the one or more Doppler parameters indicates a Doppler frequency exceeding a threshold, and means for setting the subsequent DMRS pattern to include a second number of slots of the plurality of aggregated slots with no DMRS when the one or more Doppler parameters indicates the Doppler frequency being less than or equal to the threshold, where the second number is greater than the first number. In one aspect, the aforementioned means may be the processor(s) 1204 shown in FIG. 12 configured to perform the functions recited by the aforementioned means. In another aspect, the aforementioned means may be a circuit or any apparatus configured to perform the functions recited by the aforementioned means.

Figure 15:
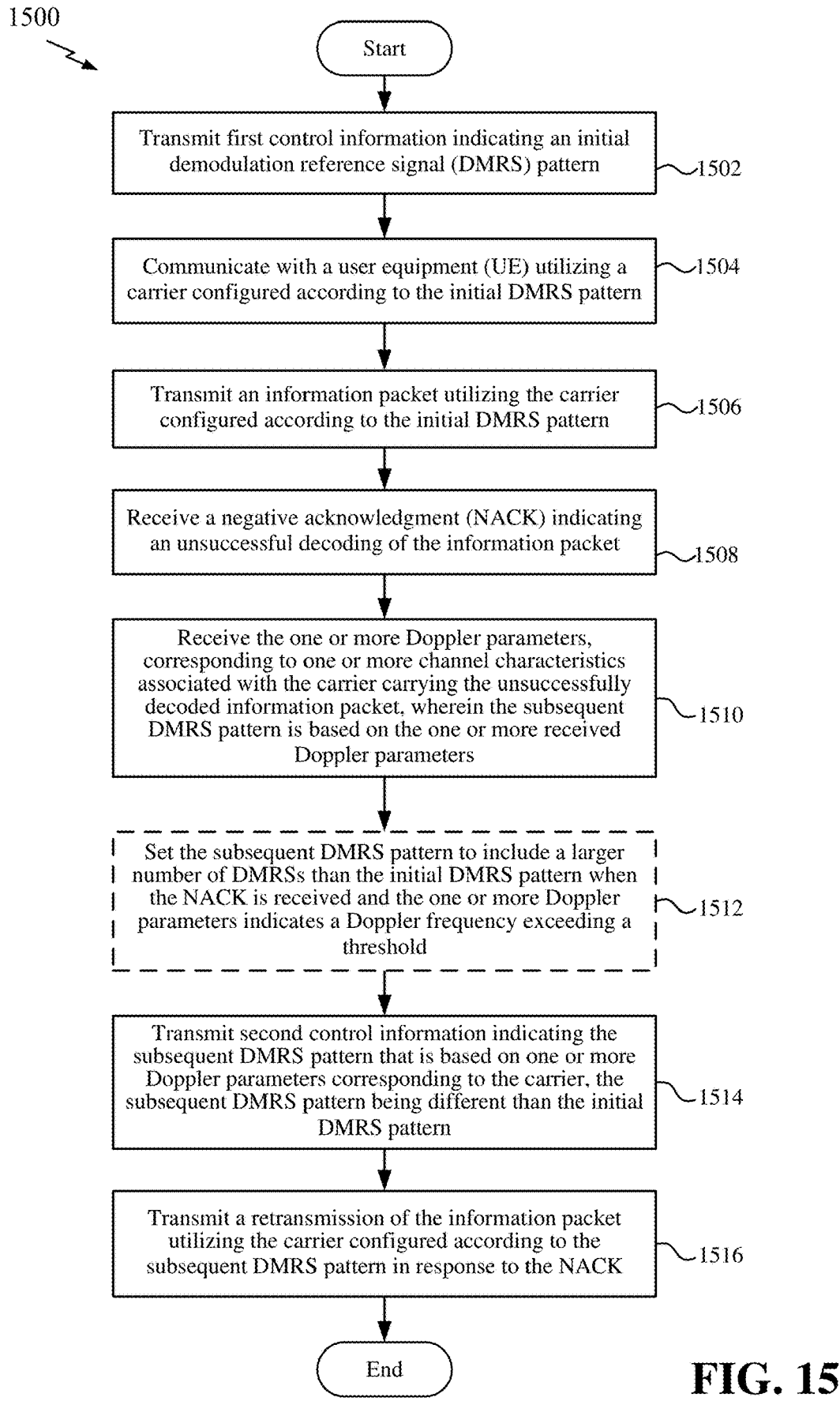
FIG. 15 is a flow chart illustrating an exemplary process for wireless communication by the base station according to some aspects.

FIG. 15 is a flow chart illustrating an exemplary process 1500 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the base station 1200 illustrated in FIG. 12. In some examples, the process 1500 may be carried out by any suitable apparatus or means for carrying out the functions or algorithm described below.

At block 1502, the base station 1200 may transmit first control information indicating an initial DMRS pattern. For example, the DMRS pattern management circuitry 1240 shown and described above in connection with FIG. 12 may provide means for transmitting the first control information. In an aspect, the first control information may be one of a dynamic indication of the DMRS pattern, or a semi-static indication of the DMRS pattern. In an aspect, the first control information may be transmitted via at least one of a MAC-CE or an RRC message.

At block 1504, the base station 1200 may communicate with a UE utilizing a carrier configured according to the initial DMRS pattern. For example, the communication management circuitry 1242 shown and described above in connection with FIG. 12 may provide means for communicating with the UE with utilizing the carrier configured according to the initial DMRS pattern.

At block 1506, the base station 1200 may transmit an information packet utilizing the carrier configured according to the initial DMRS pattern. For example, the communication management circuitry 1242 shown and described above in connection with FIG. 12 may provide means for transmitting the information packet.

At block 1508, the base station 1200 may receive a NACK indicating an unsuccessful decoding of the information packet. For example, the communication management circuitry 1242 shown and described above in connection with FIG. 12 may provide means for receiving the NACK.

At block 1510, the base station 1200 may receive the one or more Doppler parameters, corresponding to one or more channel characteristics associated with the carrier carrying the unsuccessfully decoded information packet, wherein the subsequent DMRS pattern is based on the one or more received Doppler parameters. For example, the doppler characterization circuitry 1244 shown and described above in connection with FIG. 12 may provide means for receiving the one or more Doppler parameters.

At block 1512, the base station 1200 may set the subsequent DMRS pattern to include a larger number of DMRSs per slot aggregation than the initial DMRS pattern when the NACK is transmitted and the one or more Doppler parameters indicates a Doppler frequency exceeding a threshold. For example, the DMRS pattern management circuitry 1240 shown and described above in connection with FIG. 12 may provide means for setting the subsequent DMRS pattern.

At block 1514, the base station 1200 may transmit second control information indicating the subsequent DMRS pattern that is based on one or more Doppler parameters corresponding to the carrier, the subsequent DMRS pattern being different than the initial DMRS pattern. For example, the DMRS pattern management circuitry 1240 shown and described above in connection with FIG. 12 may provide means for transmitting the second control information. In an aspect, the second control information may be transmitted via DCI.

At block 1516, the base station 1200 may communicate with the UE utilizing the carrier configured according to the subsequent DMRS pattern, where the communicating with the UE at block 1516 includes transmitting a retransmission of the information packet utilizing the carrier configured according to the subsequent DMRS pattern in response to the NACK. For example, the communication management circuitry 1242 shown and described above in connection with FIG. 12 may provide means for transmitting the retransmission. In an aspect, the carrier may be configured for slot aggregation to aggregate a plurality of slots, where each of the initial DMRS pattern and the subsequent DMRS pattern may include a respective pattern for DMRS communication across the plurality of aggregated slots.

In one configuration, the base station 1200 for wireless communication includes means for transmitting first control information indicating an initial DMRS pattern, means for communicating with a UE utilizing a carrier configured according to the initial DMRS pattern, means for transmitting second control information indicating a subsequent DMRS pattern that is based on one or more Doppler parameters corresponding to the carrier, the subsequent DMRS pattern being different than the initial DMRS pattern, and means for communicating with the UE utilizing the carrier configured according to the subsequent DMRS pattern. In an aspect, the base station 1200 may further include means for transmitting an information packet utilizing the carrier configured according to the initial DMRS pattern, means for receiving a NACK indicating an unsuccessful decoding of the information packet, means for receiving the one or more Doppler parameters, corresponding to one or more channel characteristics associated with the carrier carrying the unsuccessfully decoded information packet, and means for setting the subsequent DMRS pattern to include a larger number of DMRSs per slot aggregation than the initial DMRS pattern when the NACK is transmitted and the one or more Doppler parameters indicates a Doppler frequency exceeding a threshold. In one aspect, the aforementioned means may be the processor(s) 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, and/or 2, and utilizing, for example, the processes and/or algorithms described herein in relation to FIGS. 13, 14, and/or 15.

Figure 16:
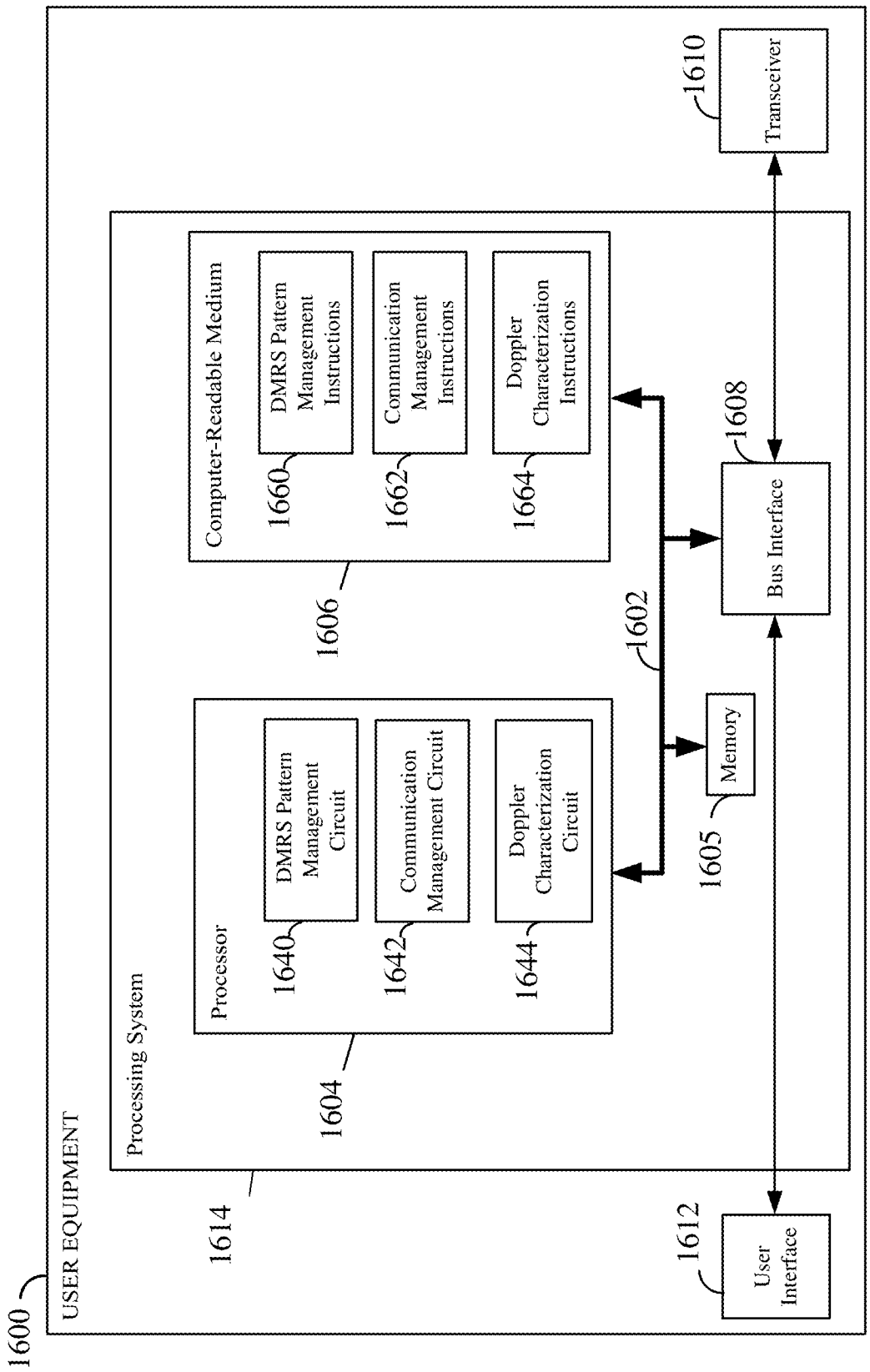
FIG. 16 is a block diagram conceptually illustrating an example of a hardware implementation for a UE according to some aspects.

FIG. 16 is a conceptual diagram illustrating an example of a hardware implementation for an exemplary UE 1600 employing a processing system 1614. In accordance with various aspects of the disclosure, an element, or any portion of an element, or any combination of elements may be implemented with a processing system 1614 that includes one or more processors 1604. For example, the UE 1600 may be a user equipment (UE) as illustrated in any one or more of FIGS. 1 and/or 2.

The processing system 1614 may be substantially the same as the processing system 1214 illustrated in FIG. 12, including a bus interface 1608, a bus 1602, memory 1605, a processor 1604, and a computer-readable storage medium 1606. Furthermore, the UE 1600 may include a user interface 1612 and a transceiver 1610 substantially similar to those described above in FIG. 12. That is, the processor 1604, as utilized in a UE 1600, may be used to implement any one or more of the processes described below and illustrated in FIGS. 9 and/or 11.

In some aspects of the disclosure, the processor 1604 may include DMRS pattern management circuitry 1640 configured for various functions, including, for example, determining a DMRS bundling scheme, DMRS sharing scheme, and/or DMRS allocation pattern based on the Doppler frequency and/or rate of change of channel characteristics.

In some aspects, the DMRS pattern management circuitry 1640 may be configured for various functions, including, for example, receiving first control information indicating an initial DMRS pattern. For example, the DMRS pattern management circuitry 1640 may be configured to implement one or more of the functions described below in relation to FIGS. 17-19, including, e.g., blocks 1702, 1802, and 1902.

In some aspects, the DMRS pattern management circuitry 1640 may be configured for various functions, including, for example, receiving second control information indicating a subsequent DMRS pattern that is based on one or more Doppler parameters corresponding to the carrier, the subsequent DMRS pattern being different than the initial DMRS pattern. For example, the DMRS pattern management circuitry 1640 may be configured to implement one or more of the functions described below in relation to FIGS. 17-19, including, e.g., blocks 1706, 1810, and 1910.

The processor 1604 may also include communication management circuitry 1642 configured for managing communication.

In some aspects, the communication management circuitry 1642 may be configured for various functions, including, for example, communicating with a base station utilizing a carrier configured according to the initial DMRS pattern. For example, the communication management circuitry 1642 may be configured to implement one or more of the functions described below in relation to FIGS. 17-19, including, e.g., blocks 1704, 1804, and 1904.

In some aspects, the communication management circuitry 1642 may be configured for various functions, including, for example, communicating with the base station utilizing the carrier configured according to the subsequent DMRS pattern. For example, the communication management circuitry 1642 may be configured to implement one or more of the functions described below in relation to FIGS. 17-19, including, e.g., blocks 1708, 1812, and 1912.

In some aspects, the communication management circuitry 1642 may be configured for various functions, including, for example, transmitting information indicating the one or more Doppler parameters to the base station. For example, the communication management circuitry 1642 may be configured to implement one or more of the functions described below in relation to FIG. 18, including, e.g., block 1808.

In some aspects, the communication management circuitry 1642 may be configured for various functions, including, for example, transmitting a NACK indicating an unsuccessful decoding of an information packet received utilizing the carrier configured according to the initial DMRS pattern. For example, the communication management circuitry 1642 may be configured to implement one or more of the functions described below in relation to FIG. 19, including, e.g., block 1906.

The processor 1604 may further include Doppler characterization circuitry 1644 configured for various functions, including, for example, determining a Doppler frequency Δf and/or a rate of change of one or more channel characteristics.

In some aspects, the Doppler characterization circuitry 1644 may be configured for various functions, including, for example, determining the one or more Doppler parameters corresponding to the carrier. For example, the Doppler characterization circuitry 1644 may be configured to implement one or more of the functions described below in relation to FIG. 18, including, e.g., block 1806.

In some aspects, the Doppler characterization circuitry 1644 may be configured for various functions, including, for example, transmitting the one or more Doppler parameters, corresponding to one or more channel characteristics associated with the carrier carrying the unsuccessfully decoded information packet. For example, the Doppler characterization circuitry 1644 may be configured to implement one or more of the functions described below in relation to FIG. 19, including, e.g., block 1908.

In one or more examples, the computer-readable storage medium 1606 may further include DMRS pattern management software/instructions 1660 configured for various functions, including, for example, managing communication.

In some aspects, the DMRS pattern management software/instructions 1660 may be configured for various functions, including, for example, receiving first control information indicating an initial DMRS pattern. For example, the DMRS pattern management software/instructions 1660 may be configured to implement one or more of the functions described below in relation to FIGS. 17-19, including, e.g., blocks 1702, 1802, and 1902.

In some aspects, the DMRS pattern management software/instructions 1660 may be configured for various functions, including, for example, receiving second control information indicating a subsequent DMRS pattern that is based on one or more Doppler parameters corresponding to the carrier, the subsequent DMRS pattern being different than the initial DMRS pattern. For example, the DMRS pattern management software/instructions 1660 may be configured to implement one or more of the functions described below in relation to FIGS. 17-19, including, e.g., blocks 1706, 1810, and 1910.

In one or more examples, the computer-readable storage medium 1606 may further include communication management software/instructions 1662 configured for various functions, including, for example, determining a DMRS bundling scheme, DMRS sharing scheme, and/or DMRS allocation pattern based on the Doppler frequency and/or rate of change of channel characteristics.

In some aspects, the communication management software/instructions 1662 may be configured for various functions, including, for example, communicating with a base station utilizing a carrier configured according to the initial DMRS pattern. For example, the communication management software/instructions 1662 may be configured to implement one or more of the functions described below in relation to FIGS. 17-19, including, e.g., blocks 1704, 1804, and 1904.

In some aspects, the communication management software/instructions 1662 may be configured for various functions, including, for example, communicating with the base station utilizing the carrier configured according to the subsequent DMRS pattern. For example, the communication management software/instructions 1662 may be configured to implement one or more of the functions described below in relation to FIGS. 17-19, including, e.g., blocks 1708, 1812, and 1912.

In some aspects, the communication management software/instructions 1662 may be configured for various functions, including, for example, transmitting information indicating the one or more Doppler parameters to the base station. For example, the communication management software/instructions 1662 may be configured to implement one or more of the functions described below in relation to FIG. 18, including, e.g., block 1808.

In some aspects, the communication management software/instructions 1662 may be configured for various functions, including, for example, transmitting a NACK indicating an unsuccessful decoding of an information packet received utilizing the carrier configured according to the initial DMRS pattern. For example, the communication management software/instructions 1662 may be configured to implement one or more of the functions described below in relation to FIG. 19, including, e.g., block 1906.

In one or more examples, the computer-readable storage medium 1606 may further include Doppler characterization software/instructions 1664 configured for various functions, including, for example, determining a Doppler frequency Δf and/or a rate of change of one or more channel characteristics.

In some aspects, the Doppler characterization software/instructions 1664 may be configured for various functions, including, for example, determining the one or more Doppler parameters corresponding to the carrier. For example, the Doppler characterization software/instructions 1664 may be configured to implement one or more of the functions described below in relation to FIG. 18, including, e.g., block 1806.

In some aspects, the Doppler characterization software/instructions 1664 may be configured for various functions, including, for example, transmitting the one or more Doppler parameters, corresponding to one or more channel characteristics associated with the carrier carrying the unsuccessfully decoded information packet. For example, the Doppler characterization software/instructions 1664 may be configured to implement one or more of the functions described below in relation to FIG. 19, including, e.g., block 1908.

Figure 17:
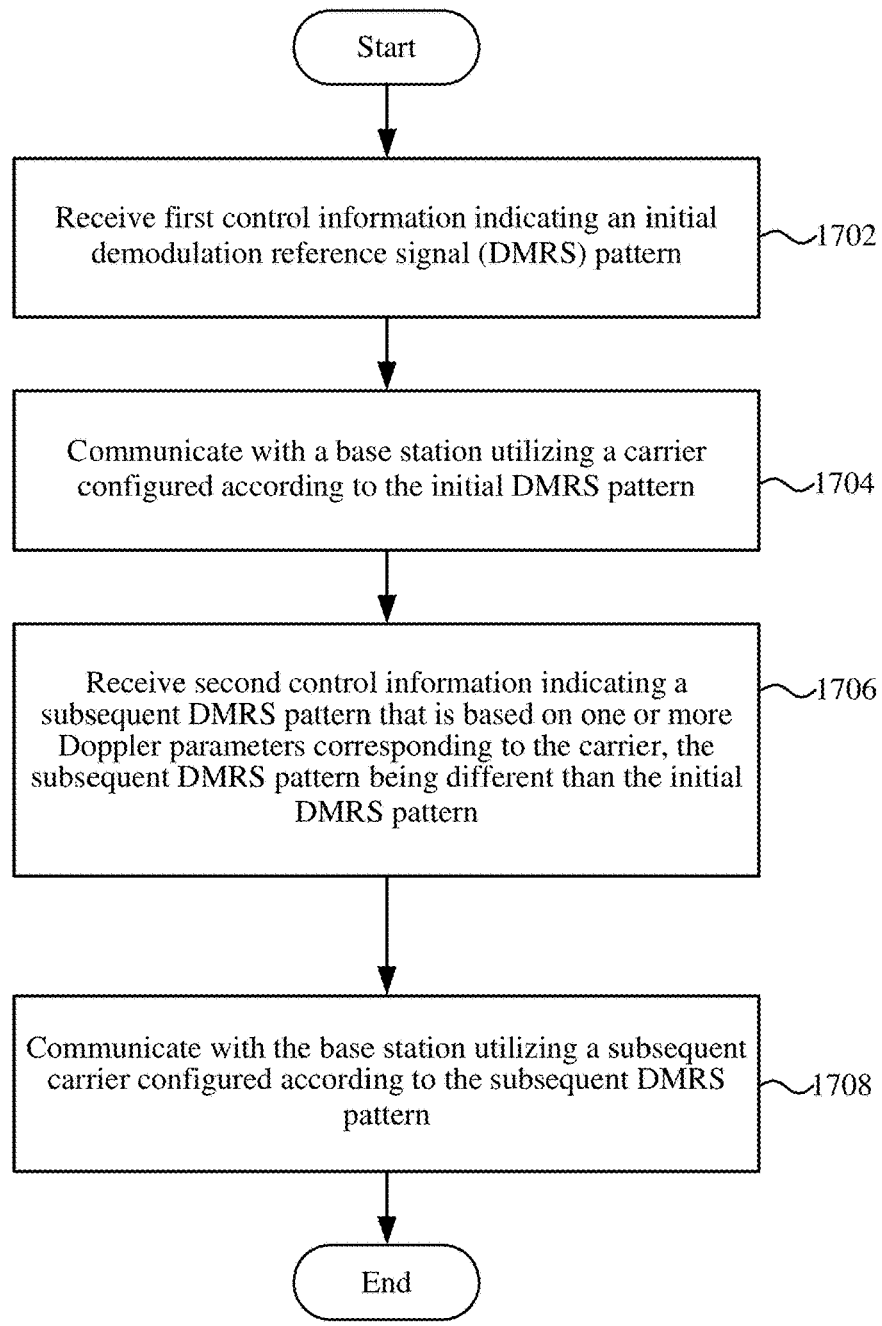
FIG. 17 is a flow chart illustrating an exemplary process for wireless communication by the base station according to some aspects.

FIG. 17 is a flow chart illustrating an exemplary process 1700 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the UE 1600 illustrated in FIG. 16. In some examples, the process 1700 may be carried out by any suitable apparatus or means for carrying out the functions or algorithm described below.

At block 1702, the UE 1600 may receive first control information indicating an initial DMRS pattern. For example, the DMRS pattern management circuitry 1640 shown and described above in connection with FIG. 16 may provide means for receiving the first control information. In an aspect, the first control information may be one of a dynamic indication of the DMRS pattern, or a semi-static indication of the DMRS pattern. In an aspect, the first control information may be received via at least one of a MAC-CE or an RRC message.

At block 1704, the UE 1600 may communicate with a base station utilizing a carrier configured according to the initial DMRS pattern. For example, the communication management circuitry 1642 shown and described above in connection with FIG. 16 may provide means for communicating with the base station utilizing the carrier configured according to the initial DMRS pattern.

At block 1706, the UE 1600 may receive second control information indicating a subsequent DMRS pattern that is based on one or more Doppler parameters corresponding to the carrier, the subsequent DMRS pattern being different than the initial DMRS pattern. For example, the DMRS pattern management circuitry 1640 shown and described above in connection with FIG. 16 may provide means for receiving the second control information. In an aspect, the second control information may be received via DCI.

At block 1708, the UE 1600 may communicate with the base station utilizing the carrier configured according to the subsequent DMRS pattern. For example, the communication management circuitry 1642 shown and described above in connection with FIG. 16 may provide means for communicating with the base station utilizing the carrier configured according to the subsequent DMRS pattern.

In one configuration, the UE 1600 for wireless communication includes means for receiving first control information indicating an initial DMRS pattern, means for communicating with a base station utilizing a carrier configured according to the initial DMRS pattern, means for receiving second control information indicating a subsequent DMRS pattern that is based on one or more Doppler parameters corresponding to the carrier, the subsequent DMRS pattern being different than the initial DMRS pattern, and means for communicating with the base station utilizing the carrier configured according to the subsequent DMRS pattern. In one aspect, the aforementioned means may be the processor(s) 1604 shown in FIG. 16 configured to perform the functions recited by the aforementioned means. In another aspect, the aforementioned means may be a circuit or any apparatus configured to perform the functions recited by the aforementioned means.

Figure 18:
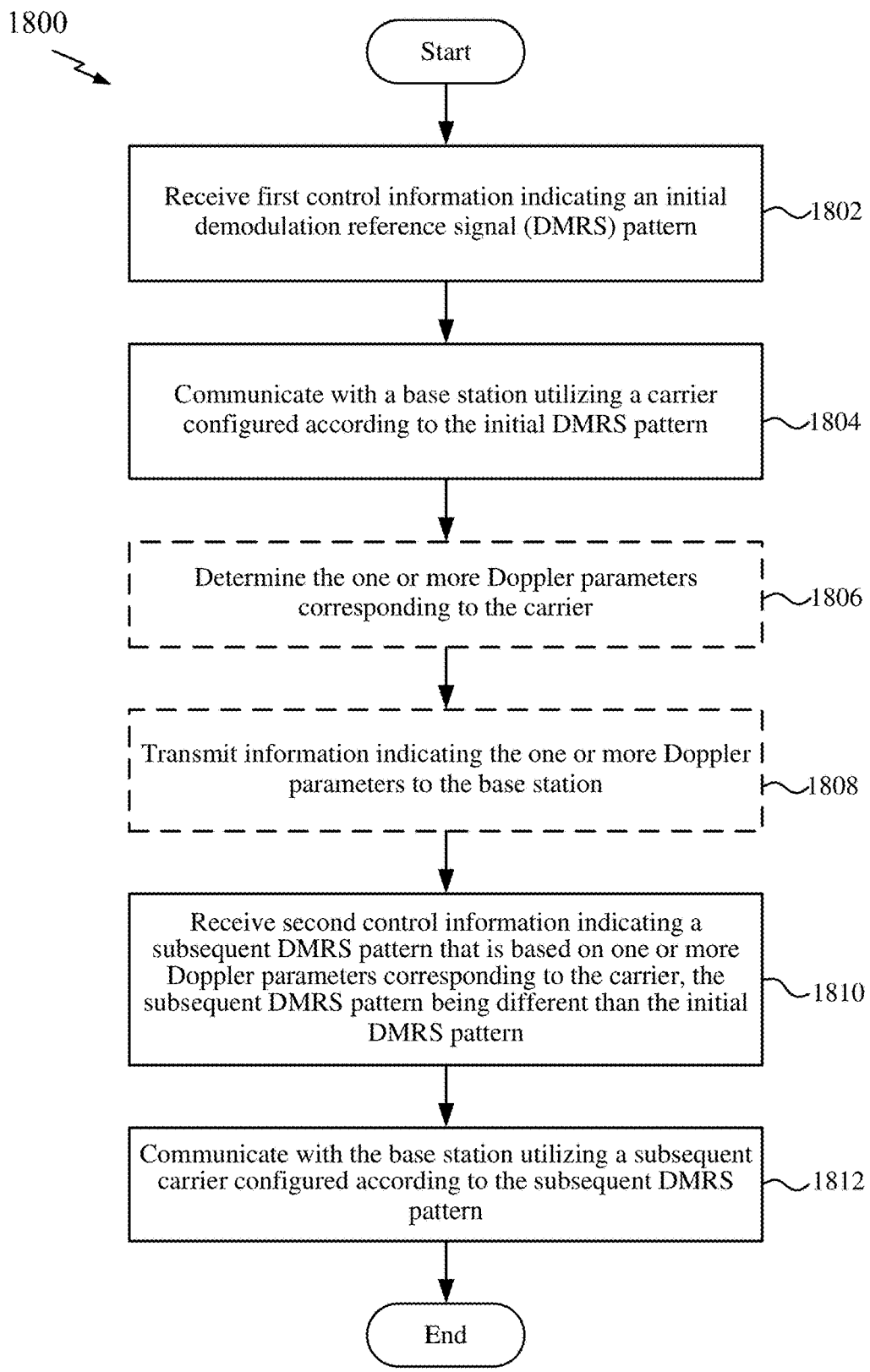
FIG. 18 is a flow chart illustrating an exemplary process for wireless communication by the base station according to some aspects.

FIG. 18 is a flow chart illustrating an exemplary process 1800 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the UE 1600 illustrated in FIG. 16. In some examples, the process 1800 may be carried out by any suitable apparatus or means for carrying out the functions or algorithm described below.

At block 1802, the UE 1600 may receive first control information indicating an initial DMRS pattern. For example, the DMRS pattern management circuitry 1640 shown and described above in connection with FIG. 16 may provide means for receiving the first control information. In an aspect, the first control information may be one of a dynamic indication of the DMRS pattern, or a semi-static indication of the DMRS pattern. In an aspect, the first control information may be received via at least one of a MAC-CE or an RRC message.

At block 1804, the UE 1600 may communicate with a base station utilizing a carrier configured according to the initial DMRS pattern. For example, the communication management circuitry 1642 shown and described above in connection with FIG. 16 may provide means for communicating with the base station utilizing the carrier configured according to the initial DMRS pattern.

At block 1806, the UE 1600 may determine the one or more Doppler parameters corresponding to the carrier. For example, the Doppler characterization circuitry 1644 shown and described above in connection with FIG. 16 may provide means for determining the one or more Doppler parameters.

In an aspect, the carrier may be configured for slot aggregation to aggregate a plurality of slots, and each of the initial DMRS pattern and the subsequent DMRS pattern may include a respective pattern for DMRS communication across the plurality of aggregated slots.

In an aspect, at least one of the initial DMRS pattern or the subsequent DMRS pattern may include at least one slot of the plurality of slots with no DMRS, where at least one DMRS in another slot of the plurality of aggregated slots may be used for the at least one slot with no DMRS.

In an aspect, the subsequent DMRS pattern may be set to include a first number of slots of the plurality of aggregated slots with no DMRS when the one or more Doppler parameters indicates a Doppler frequency exceeding a threshold, and the subsequent DMRS pattern may be set to include a second number of slots of the plurality of aggregated slots with no DMRS when the one or more Doppler parameters indicates the Doppler frequency being less than or equal to the threshold, wherein the second number is greater than the first number.

In an aspect, the carrier may include one or more DMRSs in one or more slots of the plurality of slots, the one or more DMRSs being precoded according to a same precoder.

At block 1808, the UE 1600 may transmit information indicating the one or more Doppler parameters to the base station. For example, the communication management circuitry 1642 shown and described above in connection with FIG. 16 may provide means for transmitting the information.

At block 1810, the UE 1600 may receive second control information indicating a subsequent DMRS pattern that is based on one or more Doppler parameters corresponding to the carrier, the subsequent DMRS pattern being different than the initial DMRS pattern. For example, the DMRS pattern management circuitry 1640 shown and described above in connection with FIG. 16 may provide means for receiving the second control information. In an aspect, the second control information may be received via DCI.

At block 1812, the UE 1600 may communicate with the base station utilizing the carrier configured according to the subsequent DMRS pattern. For example, the communication management circuitry 1642 shown and described above in connection with FIG. 16 may provide means for communicating with the base station utilizing the carrier configured according to the subsequent DMRS pattern.

In one configuration, the UE 1600 for wireless communication includes means for receiving first control information indicating an initial DMRS pattern, means for communicating with a base station utilizing a carrier configured according to the initial DMRS pattern, means for receiving second control information indicating a subsequent DMRS pattern that is based on one or more Doppler parameters corresponding to the carrier, the subsequent DMRS pattern being different than the initial DMRS pattern, and means for communicating with the base station utilizing the carrier configured according to the subsequent DMRS pattern. In an aspect, the UE 1600 may further include means for determining the one or more Doppler parameters corresponding to the carrier, and means for transmitting information indicating the one or more Doppler parameters to the base station. In one aspect, the aforementioned means may be the processor(s) 1604 shown in FIG. 16 configured to perform the functions recited by the aforementioned means. In another aspect, the aforementioned means may be a circuit or any apparatus configured to perform the functions recited by the aforementioned means.

Figure 19:
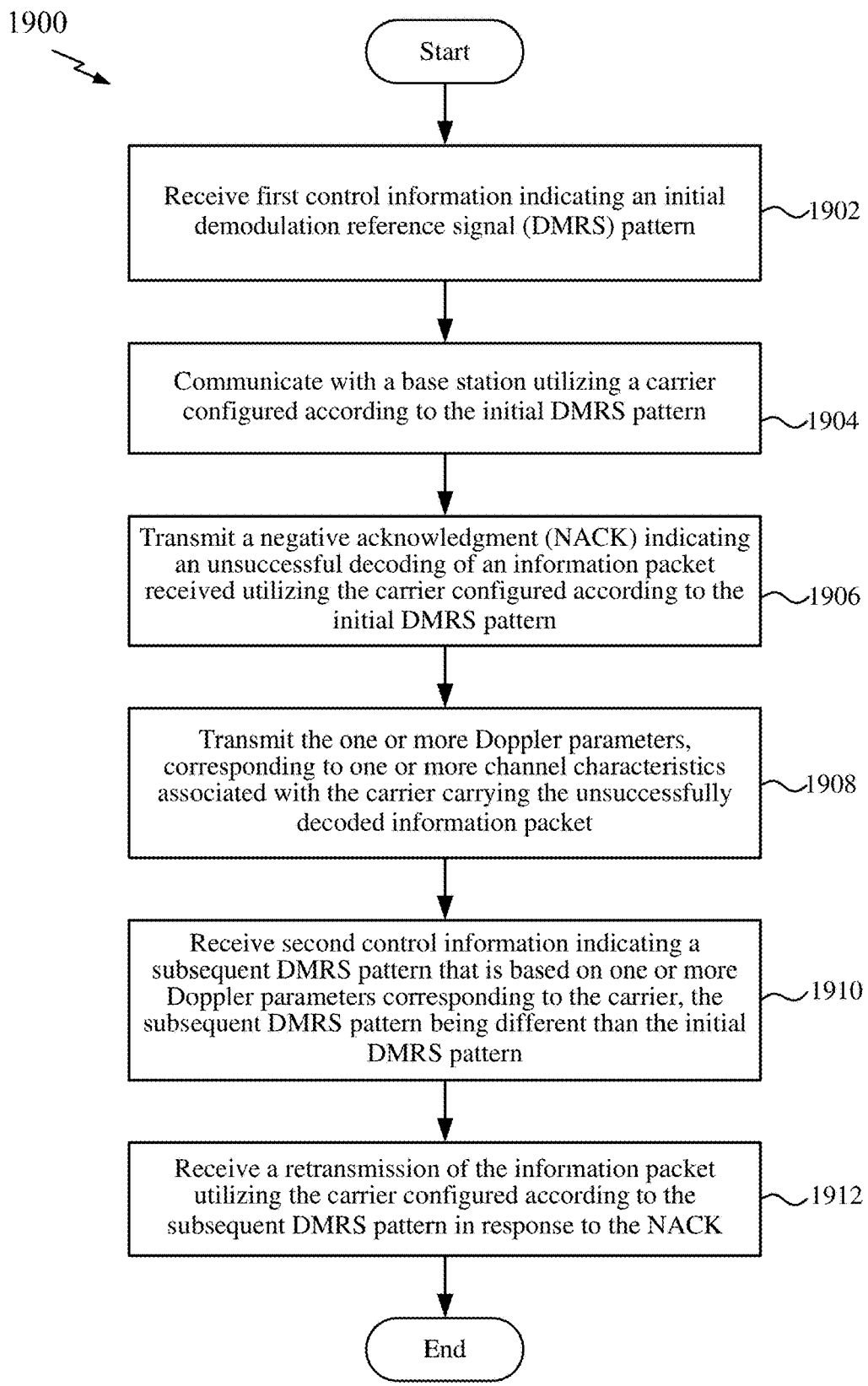
FIG. 19 is a flow chart illustrating an exemplary process for wireless communication by the base station according to some aspects.

FIG. 19 is a flow chart illustrating an exemplary process 1900 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the UE 1600 illustrated in FIG. 16. In some examples, the process 1900 may be carried out by any suitable apparatus or means for carrying out the functions or algorithm described below.

At block 1902, the UE 1600 may receive first control information indicating an initial DMRS pattern. For example, the DMRS pattern management circuitry 1640 shown and described above in connection with FIG. 16 may provide means for receiving the first control information. In an aspect, the first control information may be one of a dynamic indication of the DMRS pattern, or a semi-static indication of the DMRS pattern. In an aspect, the first control information may be received via at least one of a MAC-CE or an RRC message.

At block 1904, the UE 1600 may communicate with a base station utilizing a carrier configured according to the initial DMRS pattern. For example, the communication management circuitry 1642 shown and described above in connection with FIG. 16 may provide means for communicating with the base station utilizing the carrier configured according to the initial DMRS pattern.

At block 1906, the UE 1600 may transmit a NACK indicating an unsuccessful decoding of an information packet received utilizing the carrier configured according to the initial DMRS pattern. For example, the communication management circuitry 1642 shown and described above in connection with FIG. 16 may provide means for transmitting the NACK.

At block 1908, the UE 1600 may transmit the one or more Doppler parameters, corresponding to one or more channel characteristics associated with the carrier carrying the unsuccessfully decoded information packet. For example, the Doppler characterization circuitry 1644 shown and described above in connection with FIG. 16 may provide means for transmitting the one or more Doppler parameters.

At block 1910, the UE 1600 may receive second control information indicating a subsequent DMRS pattern that is based on one or more Doppler parameters corresponding to the carrier, the subsequent DMRS pattern being different than the initial DMRS pattern. For example, the DMRS pattern management circuitry 1640 shown and described above in connection with FIG. 16 may provide means for receiving the second control information. In an aspect, the second control information may be received via DCI. In an aspect, the subsequent DMRS pattern may be set to include a larger number of DMRSs per slot aggregation than the initial DMRS pattern when the NACK is transmitted and the one or more Doppler parameters indicates a Doppler frequency exceeding a threshold.

At block 1912, the UE 1600 may communicate with the base station utilizing the carrier configured according to the subsequent DMRS pattern by receiving a retransmission of the information packet utilizing the carrier configured according to the subsequent DMRS pattern in response to the NACK. For example, the communication management circuitry 1642 shown and described above in connection with FIG. 16 may provide means for communicating with the base station utilizing the carrier configured according to the subsequent DMRS pattern.

In one configuration, the UE 1600 for wireless communication includes means for receiving first control information indicating an initial DMRS pattern, means for communicating with a base station utilizing a carrier configured according to the initial DMRS pattern, means for receiving second control information indicating a subsequent DMRS pattern that is based on one or more Doppler parameters corresponding to the carrier, the subsequent DMRS pattern being different than the initial DMRS pattern, and means for communicating with the base station utilizing the carrier configured according to the subsequent DMRS pattern. In an aspect, the UE 1600 may further include means for transmitting a negative acknowledgment (NACK) indicating an unsuccessful decoding of an information packet received utilizing the carrier configured according to the initial DMRS pattern, and means for transmitting the one or more Doppler parameters, corresponding to one or more channel characteristics associated with the carrier carrying the unsuccessfully decoded information packet, wherein the received subsequent DMRS pattern is based on the one or more Doppler parameters. In one aspect, the aforementioned means may be the processor(s) 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1 and/or 2, and utilizing, for example, the processes and/or algorithms described herein in relation to FIGS. 17, 18, and/or 19.

The following provides an overview of several aspects of the present disclosure.

Aspect 1: A method of wireless communication operable at a base station, comprising: transmitting first control information indicating an initial demodulation reference signal (DMRS) pattern, communicating with a user equipment (UE) utilizing a carrier configured according to the initial DMRS pattern, transmitting second control information indicating a subsequent DMRS pattern that is based on one or more Doppler parameters corresponding to the carrier, the subsequent DMRS pattern being different than the initial DMRS pattern, and communicating with the UE utilizing the carrier configured according to the subsequent DMRS pattern.

Aspect 2: The method of aspect 1, wherein the first control information is one of a dynamic indication of the DMRS pattern, or a semi-static indication of the DMRS pattern.

Aspect 3: The method of aspect 1 or 2, wherein the first control information is transmitted via at least one of a media access control (MAC) control element (CE) or a radio resource control (RRC) message, and wherein the second control information is transmitted via downlink control information (DCI).

Aspect 4: The method of any one of aspects 1-3, wherein the carrier is configured for slot aggregation to aggregate a plurality of slots, and wherein each of the initial DMRS pattern and the subsequent DMRS pattern comprises a respective pattern for DMRS communication across the plurality of aggregated slots.

Aspect 5: The method of aspect 4, wherein at least one of the initial DMRS pattern or the subsequent DMRS pattern includes at least one slot of the plurality of aggregated slots with no DMRS, and wherein at least one DMRS in another slot of the plurality of aggregated slots is used for the at least one slot with no DMRS.

Aspect 6: The method of aspect 4 or 5, further comprising: setting the subsequent DMRS pattern to include a first number of slots of the plurality of aggregated slots with no DMRS when the one or more Doppler parameters indicates a Doppler frequency exceeding a threshold, and setting the subsequent DMRS pattern to include a second number of slots of the plurality of aggregated slots with no DMRS when the one or more Doppler parameters indicates the Doppler frequency being less than or equal to the threshold, wherein the second number is greater than the first number.

Aspect 7: The method of any one of aspects 4-6, wherein the carrier includes one or more DMRSs in one or more slots of the plurality of slots, the one or more DMRSs being precoded according to a same precoder.

Aspect 8: The method of any one of aspects 1-7, further comprising: receiving information indicating the one or more Doppler parameters from the UE to determine the one or more Doppler parameters.

Aspect 9: The method of aspect 1, further comprising: transmitting an information packet utilizing the carrier configured according to the initial DMRS pattern, receiving a negative acknowledgment (NACK) indicating an unsuccessful decoding of the information packet, receiving the one or more Doppler parameters, corresponding to one or more channel characteristics associated with the carrier carrying the unsuccessfully decoded information packet, wherein the subsequent DMRS pattern is based on the one or more received Doppler parameters, wherein the communicating with the UE utilizing the carrier configured according to the subsequent DMRS pattern comprises transmitting a retransmission of the information packet utilizing the carrier configured according to the subsequent DMRS pattern in response to the NACK.

Aspect 10: The method of aspect 9, further comprising: setting the subsequent DMRS pattern to include a larger number of DMRSs than the initial DMRS pattern when the NACK is received and the one or more Doppler parameters indicates a Doppler frequency exceeding a threshold.

Aspect 11: A base station comprising: at least one processor, a transceiver communicatively coupled to the at least one processor, and a memory communicatively coupled to the at least one processor, wherein the at least one processor is configured to perform any one of aspects 1 through 10.

Aspect 12: A base station for wireless communication comprising at least one means for performing any one of aspects 1 through 10.

Aspect 13: A non-transitory computer-readable storage medium storing computer-executable code, comprising code for causing a base station to perform any one of aspects 1 through 10.

Aspect 14: A method of wireless communication operable at a user equipment (UE), the method comprising: receiving first control information indicating an initial demodulation reference signal (DMRS) pattern, communicating with a base station utilizing a carrier configured according to the initial DMRS pattern, receiving second control information indicating a subsequent DMRS pattern that is based on one or more Doppler parameters corresponding to the carrier, the subsequent DMRS pattern being different than the initial DMRS pattern, and communicating with the base station utilizing the carrier configured according to the subsequent DMRS pattern.

Aspect 15: The method of aspect 14, wherein the first control information is one of a dynamic indication of the DMRS pattern, or a semi-static indication of the DMRS pattern.

Aspect 16: The method of aspect 14 or 15, wherein the first control information is received via at least one of a media access control (MAC) control element (CE) or a radio resource control (RRC) message, and wherein the second control information is received via downlink control information (DCI).

Aspect 17: The method of any one of aspects 14-16, wherein the carrier is configured for slot aggregation to aggregate a plurality of slots, and wherein each of the initial DMRS pattern and the subsequent DMRS pattern comprises a respective pattern for DMRS communication across the plurality of aggregated slots.

Aspect 18: The method of aspect 17, wherein at least one of the initial DMRS pattern or the subsequent DMRS pattern includes at least one slot of the plurality of slots with no DMRS, and wherein at least one DMRS in another slot of the plurality of aggregated slots is used for the at least one slot with no DMRS.

Aspect 19: The method of aspect 17 or 18, wherein the subsequent DMRS pattern is set to include a first number of slots of the plurality of aggregated slots with no DMRS when the one or more Doppler parameters indicates a Doppler frequency exceeding a threshold, and wherein the subsequent DMRS pattern is set to include a second number of slots of the plurality of aggregated slots with no DMRS when the one or more Doppler parameters indicates the Doppler frequency being less than or equal to the threshold, wherein the second number is greater than the first number.

Aspect 20: The method of any one of aspects 17-19, wherein the carrier includes one or more DMRSs in one or more slots of the plurality of slots, the one or more DMRSs being precoded according to a same precoder.

Aspect 21: The method of any one of aspects 14-20, further comprising: determining the one or more Doppler parameters corresponding to the carrier, and transmitting information indicating the one or more Doppler parameters to the base station.

Aspect 22: The method of aspect 14, further comprising: transmitting a negative acknowledgment (NACK) indicating an unsuccessful decoding of an information packet received utilizing the carrier configured according to the initial DMRS pattern, and transmitting the one or more Doppler parameters, corresponding to one or more channel characteristics associated with the carrier carrying the unsuccessfully decoded information packet, wherein the received subsequent DMRS pattern is based on the one or more Doppler parameters, wherein the communicating with the base station utilizing the carrier configured according to the subsequent DMRS pattern comprises receiving a retransmission of the information packet utilizing the carrier configured according to the subsequent DMRS pattern in response to the NACK.

Aspect 23: The method of aspect 22, wherein the subsequent DMRS pattern is set to include a larger number of DMRSs than the initial DMRS pattern when the NACK is transmitted and the one or more Doppler parameters indicates a Doppler frequency exceeding a threshold.

Aspect 24: A UE comprising: at least one processor, a transceiver communicatively coupled to the at least one processor, and a memory communicatively coupled to the at least one processor, wherein the at least one processor is configured to perform any one of aspects 14 through 23.

Aspect 25: A UE for wireless communication comprising at least one means for performing any one of aspects 14 through 23.

Aspect 26: A non-transitory computer-readable storage medium storing computer-executable code, comprising code for causing a UE to perform any one of aspects 14 through 23.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a base station, comprising:
   transmitting first control information indicating an initial demodulation reference signal (DMRS) pattern;
   communicating with a user equipment (UE) utilizing a carrier configured according to the initial DMRS pattern;
   transmitting second control information indicating a subsequent DMRS pattern that is selected based on whether one or more Doppler parameters corresponding to the carrier exceed a high Doppler threshold, the subsequent DMRS pattern being different than the initial DMRS pattern; and
   communicating with the UE utilizing the carrier configured according to the subsequent DMRS pattern.

2. The method of claim 1, wherein the first control information is one of a dynamic indication of the DMRS pattern, or a semi-static indication of the DMRS pattern.

3. The method of claim 1, wherein the first control information is transmitted via at least one of a media access control (MAC) control element (CE) or a radio resource control (RRC) message, and
   wherein the second control information is transmitted via downlink control information (DCI).

4. The method of claim 1, wherein the carrier is configured for slot aggregation to aggregate a plurality of slots, and wherein each of the initial DMRS pattern and the subsequent DMRS pattern comprises a respective pattern for DMRS communication across the plurality of aggregated slots.

5. The method of claim 4, wherein at least one of the initial DMRS pattern or the subsequent DMRS pattern includes at least one slot of the plurality of aggregated slots with no DMRS, and
   wherein at least one DMRS in another slot of the plurality of aggregated slots is used for the at least one slot with no DMRS.

6. The method of claim 4, further comprising:
   setting the subsequent DMRS pattern to include a first number of slots of the plurality of aggregated slots with no DMRS when the one or more Doppler parameters indicates a Doppler frequency exceeding the high Doppler threshold, and
   setting the subsequent DMRS pattern to include a second number of slots of the plurality of aggregated slots with no DMRS when the one or more Doppler parameters indicates the Doppler frequency being less than or equal to the high Doppler threshold, wherein the second number is greater than the first number.

7. The method of claim 4, wherein the carrier includes one or more DMRSs in one or more slots of the plurality of slots, the one or more DMRSs being precoded according to a same precoder.

8. The method of claim 1, further comprising:
   receiving information indicating the one or more Doppler parameters from the UE to determine the one or more Doppler parameters.

9. The method of claim 1, further comprising:
   transmitting an information packet utilizing the carrier configured according to the initial DMRS pattern;
   receiving a negative acknowledgment (NACK) indicating an unsuccessful decoding of the information packet; and
   receiving the one or more Doppler parameters, corresponding to one or more channel characteristics associated with the carrier carrying the unsuccessfully decoded information packet, wherein the subsequent DMRS pattern is based on the one or more received Doppler parameters,
   wherein the communicating with the UE utilizing the carrier configured according to the subsequent DMRS pattern comprises transmitting a retransmission of the information packet utilizing the carrier configured according to the subsequent DMRS pattern in response to the NACK.

10. The method of claim 9, further comprising:
    setting the subsequent DMRS pattern to include a larger number of DMRSs than the initial DMRS pattern when the NACK is received and the one or more Doppler parameters indicates a Doppler frequency exceeding the high Doppler threshold.

11. A base station for wireless communication, comprising:
    at least one processor;
    a transceiver communicatively coupled to the at least one processor; and
    a memory communicatively coupled to the at least one processor,
    wherein the at least one processor is configured to:
      transmit first control information indicating an initial demodulation reference signal (DMRS) pattern;
      communicate with a user equipment (UE) utilizing a carrier configured according to the initial DMRS pattern;
      transmit second control information indicating a subsequent DMRS pattern that is selected based on whether one or more Doppler parameters corresponding to the carrier exceed a high Doppler threshold, the subsequent DMRS pattern being different than the initial DMRS pattern; and
      communicate with the UE utilizing the carrier configured according to the subsequent DMRS pattern.

12. The base station of claim 11, wherein the carrier is configured for slot aggregation to aggregate a plurality of slots, and wherein each of the initial DMRS pattern and the subsequent DMRS pattern comprises a respective pattern for DMRS communication across the plurality of aggregated slots.

13. The base station of claim 12, wherein at least one of the initial DMRS pattern or the subsequent DMRS pattern includes at least one slot of the plurality of slots with no DMRS, and
    wherein at least one DMRS in another slot of the plurality of aggregated slots is used for the at least one slot with no DMRS.

14. The base station of claim 12, wherein the carrier includes one or more DMRSs in one or more slots of the plurality of slots, the one or more DMRSs being precoded according to a same precoder.

15. The base station of claim 11, wherein the at least one processor is further configured to:
    transmit an information packet utilizing the carrier configured according to the initial DMRS pattern;
    receive a negative acknowledgment (NACK) indicating an unsuccessful decoding of the information packet; and
    receive the one or more Doppler parameters, corresponding to one or more channel characteristics associated with the carrier carrying the unsuccessfully decoded information packet, wherein the subsequent DMRS pattern is based on the one or more received Doppler parameters, wherein the at least one processor configured to communicate with the UE utilizing the carrier configured according to the subsequent DMRS pattern is further configured to transmit a retransmission of the information packet utilizing the carrier configured according to the subsequent DMRS pattern in response to the NACK.

16. A method of wireless communication operable at a user equipment (UE), the method comprising:
receiving first control information indicating an initial demodulation reference signal (DMRS) pattern;
communicating with a base station utilizing a carrier configured according to the initial DMRS pattern;
receiving second control information indicating a subsequent DMRS pattern that is selected based on whether one or more Doppler parameters corresponding to the carrier exceed a high Doppler threshold, the subsequent DMRS pattern being different than the initial DMRS pattern; and
communicating with the base station utilizing the carrier configured according to the subsequent DMRS pattern.

17. The method of claim 16, wherein the first control information is one of a dynamic indication of the DMRS pattern, or a semi-static indication of the DMRS pattern.

18. The method of claim 16, wherein the first control information is received via at least one of a media access control (MAC) control element (CE) or a radio resource control (RRC) message, and
wherein the second control information is received via downlink control information (DCI).

19. The method of claim 16, wherein the carrier is configured for slot aggregation to aggregate a plurality of slots, and wherein each of the initial DMRS pattern and the subsequent DMRS pattern comprises a respective pattern for DMRS communication across the plurality of aggregated slots.

20. The method of claim 19, wherein at least one of the initial DMRS pattern or the subsequent DMRS pattern includes at least one slot of the plurality of slots with no DMRS, and
wherein at least one DMRS in another slot of the plurality of aggregated slots is used for the at least one slot with no DMRS.

21. The method of claim 19, wherein the subsequent DMRS pattern is set to include a first number of slots of the plurality of aggregated slots with no DMRS when the one or more Doppler parameters indicates a Doppler frequency exceeding the high Doppler, and
wherein the subsequent DMRS pattern is set to include a second number of slots of the plurality of aggregated slots with no DMRS when the one or more Doppler parameters indicates the Doppler frequency being less than or equal to the high Doppler threshold, wherein the second number is greater than the first number.

22. The method of claim 19, wherein the carrier includes one or more DMRSs in one or more slots of the plurality of slots, the one or more DMRSs being precoded according to a same precoder.

23. The method of claim 16, further comprising:
determining the one or more Doppler parameters corresponding to the carrier; and
transmitting information indicating the one or more Doppler parameters to the base station.

24. The method of claim 16, further comprising:
transmitting a negative acknowledgment (NACK) indicating an unsuccessful decoding of an information packet received utilizing the carrier configured according to the initial DMRS pattern; and
transmitting the one or more Doppler parameters, corresponding to one or more channel characteristics associated with the carrier carrying the unsuccessfully decoded information packet, wherein the received subsequent DMRS pattern is based on the one or more Doppler parameters,
wherein the communicating with the base station utilizing the carrier configured according to the subsequent DMRS pattern comprises receiving a retransmission of the information packet utilizing the carrier configured according to the subsequent DMRS pattern in response to the NACK.

25. The method of claim 24, wherein the subsequent DMRS pattern is set to include a larger number of DMRSs than the initial DMRS pattern when the NACK is transmitted and the one or more Doppler parameters indicates a Doppler frequency exceeding the high Doppler threshold.

26. A user equipment (UE) for wireless communication, comprising:
at least one processor;
a transceiver communicatively coupled to the at least one processor; and
a memory communicatively coupled to the at least one processor,
wherein the at least one processor is configured to:
receive first control information indicating an initial demodulation reference signal (DMRS) pattern;
communicate with a base station utilizing a carrier configured according to the initial DMRS pattern;
receive second control information indicating a subsequent DMRS pattern that is selected based on whether one or more Doppler parameters corresponding to the carrier exceed a high Doppler threshold, the subsequent DMRS pattern being different than the initial DMRS pattern; and
communicate with the base station utilizing the carrier configured according to the subsequent DMRS pattern.

27. The UE of claim 26, wherein the carrier is configured for slot aggregation to aggregate a plurality of slots, and wherein each of the initial DMRS pattern and the subsequent DMRS pattern comprises a respective pattern for DMRS communication across the plurality of aggregated slots.

28. The UE of claim 27, wherein at least one of the initial DMRS pattern or the subsequent DMRS pattern includes at least one slot of the plurality of slots with no DMRS, and
wherein at least one DMRS in another slot of the plurality of aggregated slots is used for the at least one slot with no DMRS.

29. The UE of claim 27, wherein the carrier includes one or more DMRSs in one or more slots of the plurality of slots, the one or more DMRSs being precoded according to a same precoder.

30. The UE of claim 26, wherein the at least one processor is further configured to:
transmit a negative acknowledgment (NACK) indicating an unsuccessful decoding of an information packet received utilizing the carrier configured according to the initial DMRS pattern; and
transmit the one or more Doppler parameters, corresponding to one or more channel characteristics associated with the carrier carrying the unsuccessfully decoded information packet, wherein the received subsequent DMRS pattern is based on the one or more Doppler parameters, wherein the at least one processor configured to communicate with the base station utilizing the carrier configured according to the subsequent DMRS pattern is further configured to receive a retransmission of the information packet utilizing the carrier configured according to the subsequent DMRS pattern in response to the NACK.

* * * * *